United States Patent
Duan

(10) Patent No.: US 10,324,974 B2
(45) Date of Patent: Jun. 18, 2019

(54) DISPLAY CONTROL METHOD AND APPARATUS FOR MULTIMEDIA DATA

(71) Applicant: TENCENT TECHNOLOGY (SHENZHEN) COMPANY LIMITED, Shenzhen (CN)

(72) Inventor: Ying Duan, Shenzhen (CN)

(73) Assignee: Tencent Technology (Shenzhen) Compnay Limited, Shenzhen (CN)

( * ) Notice: Subject to any disclaimer, the term of this patent is extended or adjusted under 35 U.S.C. 154(b) by 538 days.

(21) Appl. No.: 15/109,864

(22) PCT Filed: Mar. 4, 2015

(86) PCT No.: PCT/CN2015/073635
§ 371 (c)(1),
(2) Date: Jul. 6, 2016

(87) PCT Pub. No.: WO2015/131823
PCT Pub. Date: Sep. 11, 2015

(65) Prior Publication Data
US 2016/0335256 A1    Nov. 17, 2016

(30) Foreign Application Priority Data
Mar. 7, 2014    (CN) .......................... 2014-10083754

(51) Int. Cl.
*G06F 16/438*    (2019.01)
*G06F 16/44*    (2019.01)
*G06Q 30/02*    (2012.01)

(52) U.S. Cl.
CPC .......... *G06F 16/438* (2019.01); *G06F 16/444* (2019.01); *G06Q 30/0241* (2013.01); *G06Q 30/0277* (2013.01)

(58) Field of Classification Search
CPC . G06F 16/438; G06F 16/444; G06Q 30/0241; G06Q 30/0277
(Continued)

(56) References Cited

U.S. PATENT DOCUMENTS 6,151,017 A * 11/2000 Suzuoka ............. G06F 3/04842
715/201
7,792,876 B2 * 9/2010 Easwar ............... G06F 16/9577
707/803
(Continued)

FOREIGN PATENT DOCUMENTS

| CN | 101443803 A | 5/2009 |
| CN | 102567902 A | 7/2012 |

(Continued)

OTHER PUBLICATIONS

The State Intellectual Property Office of the People's Republic of China (SIPO) Office Action 1 for 201410083754.8 dated Mar. 9, 2018 6 Pages (including translation).
(Continued)

*Primary Examiner* — Robert Stevens
(74) *Attorney, Agent, or Firm* — Anova Law Group, PLLC

(57) ABSTRACT

The present disclosure discloses a display control method and apparatus for multimedia data, and belongs to the field of Internet technologies. The method includes: acquiring a ratio of a total real display count to a total planning display count corresponding to each display area within a first time period, determining the ratio as a data display rate of each display area within the first time period, and controlling, according to the data display rate of each display area within the first time period, multimedia data displayed in each display area. In the present disclosure, a data display rate of each display area within a first time period is acquired, and multimedia data displayed in each display area is controlled (Continued)

according to the data display rate of each display area within the first time period, so that stability of accuracy of a control result is improved, and a control effect is enhanced.

20 Claims, 11 Drawing Sheets

(58) Field of Classification Search
USPC .......................................................... 707/722
See application file for complete search history.

(56) References Cited

U.S. PATENT DOCUMENTS

| | | | |
|---|---|---|---|
| 8,370,760 B2* | 2/2013 | Yamazaki | H04N 7/163 |
| | | | 705/14.4 |
| 2014/0098104 A1* | 4/2014 | Kirknel | G06T 11/206 |
| | | | 345/440.2 |
| 2014/0180828 A1* | 6/2014 | Iwasaki | G06Q 30/02 |
| | | | 705/14.68 |
| 2015/0212700 A1* | 7/2015 | Mithal | G06F 3/04842 |
| | | | 715/765 |

FOREIGN PATENT DOCUMENTS

| | | |
|---|---|---|
| CN | 102741872 A | 10/2012 |
| CN | 102999856 A | 3/2013 |
| EP | 2081141 A1 | 7/2009 |
| EP | 2579200 A1 | 4/2013 |
| WO | 2009085471 A2 | 7/2009 |
| WO | 2009086471 A2 | 7/2009 |
| WO | 2010084610 A1 | 7/2010 |

OTHER PUBLICATIONS

The World Intellectual Property Organization (WIPO) International Search Report for PCT/CN2015/073635 dated Jun. 15, 2015, 3 pages.

* cited by examiner

DISPLAY CONTROL METHOD AND APPARATUS FOR MULTIMEDIA DATA

CROSS-REFERENCE TO RELATED APPLICATION

This application is a national stage of PCT Application No. PCT/CN2015/073635, filed on Mar. 4, 2015, which claims priority to a Chinese patent application No. 2014100837548, filed on Mar. 7, 2014, the content of all of which is incorporated herein by reference in their entirety.

FIELD OF THE TECHNOLOGY

The present disclosure relates to the field of Internet technologies, and in particular, to a display control method and apparatus for multimedia data.

BACKGROUND OF THE DISCLOSURE

As Internet technologies are widely applied nowadays, operators of various applications based on Internet technologies increase profits of the applications in a manner of displaying multimedia data in the applications. A provider of multimedia data determines a planning display count and a planning display time interval for multimedia data that needs to be displayed, and an application then displays the multimedia data according to the planning display count within the corresponding planning display time interval. However, for some reasons such as system errors, a case in which a real display count of multimedia data displayed in a planning display interval is different from a planning display count may occur. In this case, an operator of an application needs to make a response to this case, so as to prevent this case from causing a loss to an information provider. Therefore, how to control display of multimedia data is the key to improving a display effect of multimedia data.

In an existing display control method for multimedia data: A display control person of multimedia data acquires, at an interval of a preset time, a real display count of displaying each piece of multimedia data within the preset time period, separately determines whether a real display count of displaying each piece of multimedia data is the same as a planning display count of each piece of multimedia data, and controls, if a real display count of displaying a piece of multimedia data is different from a planning display count of the multimedia data, display of the multimedia data.

Because a display control person of multimedia data determines whether to perform display control on multimedia data, and determination by a display control person of multimedia data is subject to objective reasons such as visual fatigue, a control result obtained through control by means of the existing technology has unstable accuracy and a control effect is affected.

SUMMARY

To solve the problems in the existing technology, embodiments of the present invention provide a display control method and apparatus for multimedia data. The technical solutions are as follows:

According to a first aspect, a display control method for multimedia data is provided, the method including:

distributing each piece of multimedia data to a corresponding display area, and acquiring a real display count and a planning display count of each piece of multimedia data in each display area within a first time period;

acquiring, according to the real display counts of all multimedia data in each display area within the first time period, a total real display count corresponding to each display area within the first time period, and acquiring, according to the planning display counts of all multimedia data in each display area within the first time period, a total planning display count corresponding to each display area within the first time period; and determining a ratio of the total real display count to the total planning display count corresponding to each display area within the first time period as a data display rate of each display area within the first time period, and controlling, according to the data display rate of each display area within the first time period, multimedia data displayed in each display area;

the display area being at least one, and any multimedia data corresponding to at least one display area.

According to another aspect, a display control apparatus for multimedia data is provided, the apparatus including:

a distribution module, configured to distribute each piece of multimedia data to a corresponding display area;

a first acquisition module, configured to acquire a real display count and a planning display count of each piece of multimedia data in each display area within a first time period;

a second acquisition module, configured to acquire, according to the real display counts of all multimedia data in each display area within the first time period acquired by the first acquisition module, a total real display count corresponding to each display area within the first time period;

a third acquisition module, configured to acquire, according to the planning display counts of all multimedia data in each display area within the first time period acquired by the second acquisition module, a total planning display count corresponding to each display area within the first time period;

a first determination module, configured to determine a ratio of the total real display count to the total planning display count corresponding to each display area within the first time period as a data display rate of each display area within the first time period; and a control module, configured to control, according to the data display rate of each display area within the first time period determined by the first determination module, multimedia data displayed in each display area;

the display area being at least one, and any multimedia data corresponding to at least one display area.

The beneficial effects brought by the technical solutions provided in the embodiments of the present invention are as follows:

A data display rate of each display area within a first time period is acquired, and multimedia data displayed in each display area is controlled according to the data display rate of each display area within the first time period, so that stability of accuracy of a control result is improved, and further a control effect is enhanced.

BRIEF DESCRIPTION OF THE DRAWINGS

To illustrate the technical solutions in the embodiments of the present invention more clearly, drawings required in description of the embodiments will be introduced simply in the following. It is obvious that the drawings in the following description are only some of the embodiments of the present invention, and a person of ordinary skill in the art may obtain other drawings based on the drawings without creative efforts.

DESCRIPTION OF EMBODIMENTS

To make the technical solutions and advantages in the present invention clearer, the following further describes the implementation manners of the present invention in detail with reference to the accompanying drawings.

Figure 1:
FIG. 1 is a schematic diagram of an implementation environment of a display control method for multimedia data provided in an embodiment of the present invention.

An embodiment of the present invention provides a display control method for multimedia data. Referring to FIG. 1, FIG. 1 is a schematic diagram of an implementation environment involved in the display control method for multimedia data provided in the embodiment of the present invention. The implementation environment includes a data processing server 101 and a data storage server 102. The display control method for multimedia data provided in the embodiment of the present invention may be applied to the data processing server 101 to control a condition of multimedia data displayed in real time.

The data storage server 102 is configured to store in real time a real display count and a planning display count of each piece of multimedia data in each area at current time, so as to provide the data processing server 101 with a real display count and a planning display count of each piece of multimedia data in each display area within any historical time period. A data table structure of data stored in the data storage server 102 may be shown in Table 1.

TABLE 1

| Field | Type | Empty | Default | Definition |
|---|---|---|---|---|
| Fid | int(11) | No | | Auto-increment identifier |
| Flocation_id | varchar(30) | No | | Advertisement location identifier |
| Farea_code | varchar(50) | No | | Display area code |
| Farea_name | varchar(50) | No | | Display area name |
| Fpre_view | int(11) | No | 0 | Predicted display count |
| Fplanning_view | int(11) | No | 0 | Planning display count |
| Freal_view | int(11) | No | 0 | Real display count |
| Freal_rate | Double | No | 0 | Data display rate |
| Fdate | Date | No | 0000-00-00 | Date |
| Ftime | int(5) | No | | Hour |
| Fopt_user | varchar(50) | No | | Real operator |
| Fopt_time | Datetime | No | 0000-00-00 00:00:00 | Record operation time |

Embodiment 1

Figure 2:
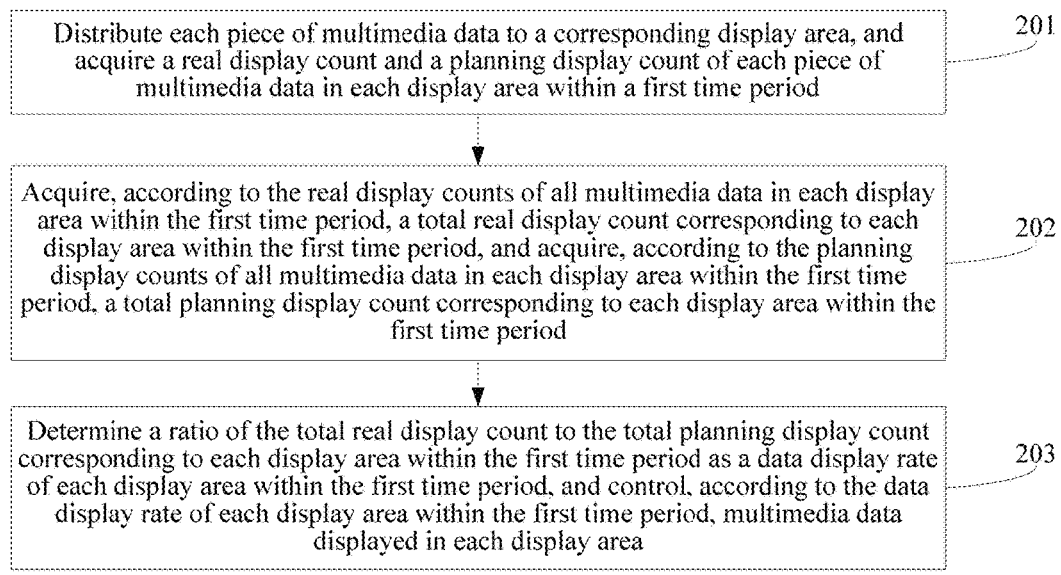
FIG. 2 is a flowchart of a display control method for multimedia data provided in Embodiment 1 of the present invention.

With reference to the foregoing implementation environment, this embodiment provides a display control method for multimedia data. Referring to FIG. 2, a procedure of the method provided in this embodiment is specifically as follows:

201: Distribute each piece of multimedia data to a corresponding display area, and acquire a real display count and a planning display count of each piece of multimedia data in each display area within a first time period.

202: Acquire, according to the real display counts of all multimedia data in each display area within the first time period, a total real display count corresponding to each display area within the first time period, and acquire, according to the planning display counts of all multimedia data in each display area within the first time period, a total planning display count corresponding to each display area within the first time period.

203: Determine a ratio of the total real display count to the total planning display count corresponding to each display area within the first time period as a data display rate of each display area within the first time period, and control, according to the data display rate of each display area within the first time period, multimedia data displayed in each display area.

The display area is at least one, and any multimedia data corresponds to at least one display area.

Preferably, the controlling, according to the data display rate of each display area within the first time period, multimedia data displayed in each display area includes:

determining, according to a geographical location of each display area, a presentation area of each display area on a map presentation page, and displaying, in the presentation area of each display area on the map presentation page, a name corresponding to each display area;

displaying, according to the data display rate of each display area within the first time period, a corresponding color in the presentation area of each display area on the map presentation page, and controlling, according to the color displayed in the presentation area of each display area on the map presentation page, multimedia data displayed in each display area.

Preferably, the map presentation page includes an automatic play function; and after the displaying, according to the data display rate of each display area within the first time period, a corresponding color in the presentation area of each display area on the map presentation page, the method further includes:

acquiring, after the automatic play function is selected, start time and end time of the automatic play function;

dividing a time period corresponding to the start time to the end time into at least two sub-time periods;

determining a data display rate of each display area within each sub-time period, and determining a first color corresponding to the data display rate of each display area within each sub-time period; and selecting a sub-time period at an interval of a preset time on the basis of a time order of the sub-time periods, and displaying the color in the presentation area of each display area on the map presentation page as the first color corresponding to the data display rate of each display area within the selected sub-time period.

Preferably, the determining a data display rate of each display area within each sub-time period includes:

acquiring a real display count and a planning display count of each piece of multimedia data in each display area within each sub-time period;

acquiring, according to the real display counts of all multimedia data in each display area within each sub-time period, a total real display count corresponding to each display area within each sub-time period, and acquiring, according to the planning display counts of all multimedia data in each display area within each sub-time period, a total planning display count corresponding to each display area within each sub-time period; and determining a ratio of the total real display count to the total planning display count corresponding to each display area within each sub-time period as the data display rate of each display area within each sub-time period.

Preferably, after the controlling, according to the data display rate of each display area within the first time period, multimedia data displayed in each display area, the method further includes:

determining, according to the data display rate of each display area within the first time period, a display area meeting a precautionary condition; and sending, if at least one display area meets the precautionary condition, a precautionary alarm to the display area meeting the precautionary condition.

Preferably, after the sending a precautionary alarm to the display area meeting the precautionary condition, further including:

determining a presentation area of each display area meeting the precautionary condition on the map presentation page; and displaying an edge color of the presentation area of each display area meeting the precautionary condition on the map presentation page as a preset color.

Preferably, the displaying, according to the data display rate of each display area within the first time period, a corresponding color in the presentation area of each display area on the map presentation page includes:

determining a second color corresponding to the data display rate of each display area within the first time period; and displaying the color in the presentation area of each display area on the map presentation page as the second color corresponding to the data display rate of each display area within the first time period.

Preferably, after the displaying, according to the data display rate of each display area within the first time period, a corresponding color in the presentation area of each display area on the map presentation page, the method further includes:

determining, after a presentation area of any display area on the map presentation page is selected, to present a detail page of the data display rate of the any display area within the first time period, and presenting, in the detail page, the data display rate of the any display area within the first time period.

Preferably, the determining, according to the data display rate of each display area within the first time period, a display area meeting a precautionary condition includes:

acquiring a precautionary range corresponding to each display area within the first time period, and determining whether the data display rate of each display area within the first time period is in the precautionary range corresponding to each display area within the first time period; and determining, if the data display rate of any display area within the first time period is outside the precautionary range corresponding to the any display area within the first time period, the any display area as the display area meeting the precautionary condition.

Preferably, the acquiring a precautionary range corresponding to each display area within the first time period includes:

acquiring real display counts and planning display counts of multimedia data in each display area within at least two consecutive second time periods, where the second time periods are time periods before the first time period;

acquiring, according to the real display count of each piece of multimedia data in each display area within each second preset time period, a total real display count corresponding to each display area within each second time period, and acquiring, according to the planning display count of each piece of multimedia data in each display area within each second preset time period, a total planning display count corresponding to each display area within each second time period;

determining a ratio of the total real display count to the total planning display count corresponding to each display area within each second time period as a data display rate of each display area within each second time period; and acquiring, according to the data display rate of each display area within each second time period, the precautionary range corresponding to each display area within the first time period.

Preferably, the acquiring, according to the data display rate of each display area within each second time period, the precautionary range corresponding to each display area within the first time period includes:

determining, according to the data display rate of each display area within each second time period, a maximum precautionary threshold and a minimum precautionary threshold corresponding to each display area within the second time period; and determining a range between the maximum precautionary threshold and the minimum precautionary threshold corresponding to each display area within the second time period as the precautionary range corresponding to each display area within the first time period.

Preferably, the determining, according to the data display rate of each display area within each second time period, a maximum precautionary threshold and a minimum precautionary threshold corresponding to each display area within the second time period includes:

determining a maximum data display rate of the data display rate of each display area within each second time period as the maximum precautionary threshold corresponding to each display area within the second time period; and determining a minimum data display rate of the data display rate of each display area within each second time period as the minimum precautionary threshold corresponding to each display area within the second time period.

Optionally, the determining, according to the data display rate of each display area within each second time period, a maximum precautionary threshold and a minimum precautionary threshold corresponding to each display area within the second time period includes:

determining, according to the data display rate of each display area within each second time period, an average data display rate of each display area within the second time period;

determining a sum of the average data display rate and a preset threshold as the maximum precautionary threshold corresponding to each display area within the second time period; and determining a difference between the average data display rate and the preset threshold as the minimum precautionary threshold corresponding to each display area within the second time period.

In the method provided in this embodiment, a data display rate of each display area within a first time period is acquired, and multimedia data displayed in each display area is controlled according to the data display rate of each display area within the first time period, so that stability of accuracy of a control result and a control effect are improved. In addition, the data display rate of each display area within the first time period is presented on a map presentation page, thereby improving intuitiveness for controlling multimedia data displayed in each display area, and enhancing a display effect of multimedia data.

To describe the display control method for multimedia data provided in the foregoing embodiment more clearly, the display control method for multimedia data is described in detail with reference to the content in the foregoing embodiment and by using Embodiment 2 in the following as an example.

Embodiment 2

Figure 3:
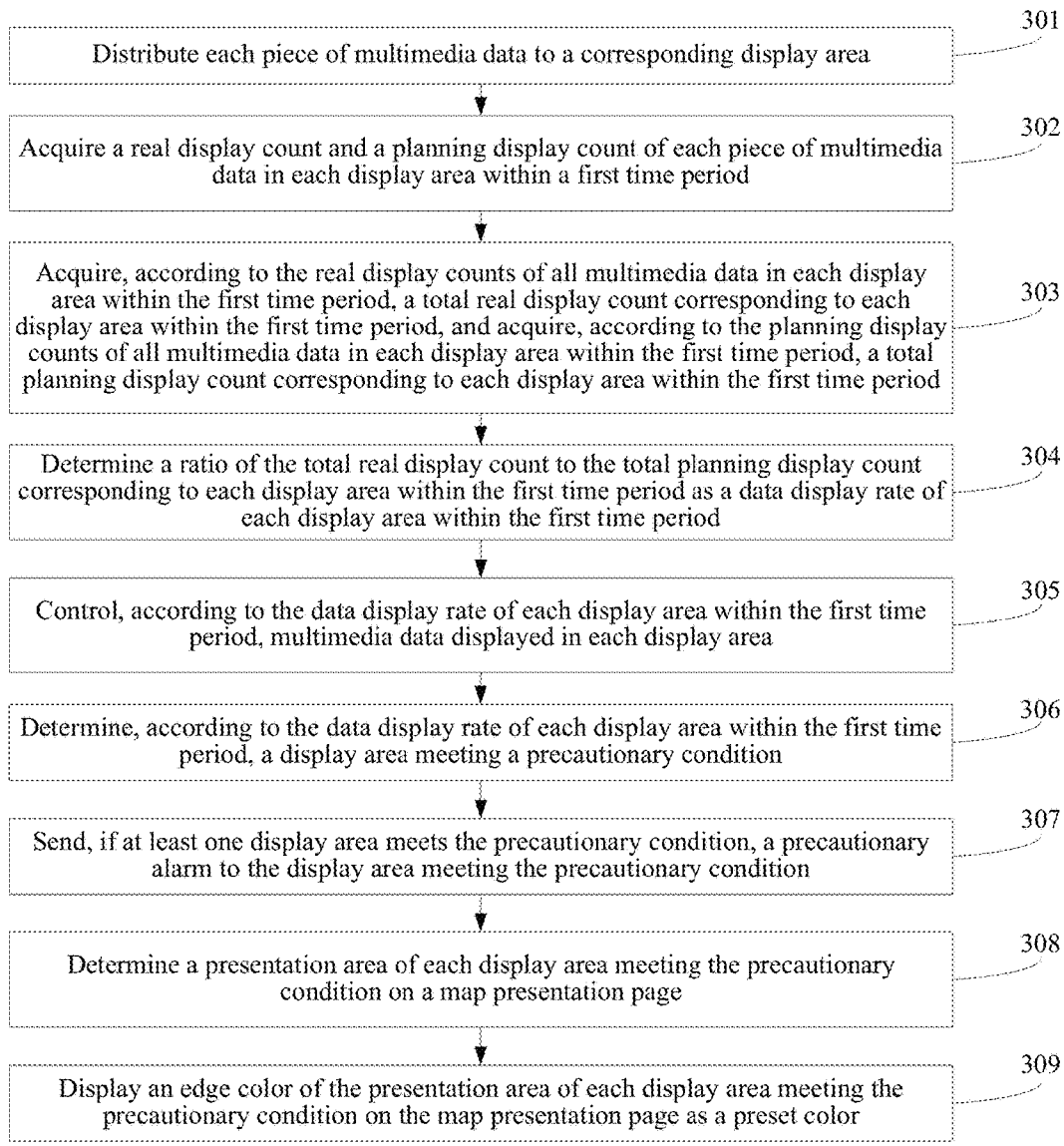
FIG. 3 is a flowchart of a display control method for multimedia data provided in Embodiment 2 of the present invention.

With reference to the foregoing implementation environment and the content of Embodiment 1 in the foregoing, this embodiment provides a display control method for multimedia data. For ease of description, an example is used in this embodiment, in which display areas are Liaoning Province, Shandong Province, and Jilin Province, multimedia data includes advertisement A, advertisement B, and advertisement C, where advertisement A and advertisement C both correspond to display areas of Liaoning Province, Shandong Province, and Jilin Province, and advertisement B corresponds to display areas of Shandong Province and Jilin Province, and a first time period is the entire day of March 5. The method provided in this embodiment is described in detail by using an example. Referring to FIG. 3, a procedure of the method provided in this embodiment is specifically as follows:

301: Distribute each piece of multimedia data to a corresponding display area.

The display area is at least one, and any multimedia data corresponds to at least one display area.

When providing multimedia data, a provider of the multimedia data specifies a display area where the multimedia data is to be displayed, and therefore each piece of multimedia data may be distributed in a display area specified for each piece of multimedia data. Besides, each piece of multimedia data may further be distributed to a corresponding display area according to other standards, and a specific standard for distributing each piece of multimedia data to a corresponding display area is not limited in this embodiment.

For example, advertisement A is separately distributed to Liaoning Province, Shandong Province, and Jilin Province, and advertisement B is separately distributed to Shandong Province and Jilin Province, and advertisement C is distributed to Liaoning Province, Shandong Province, and Jilin Province.

302: Acquire a real display count and a planning display count of each piece of multimedia data in each display area within a first time period.

When providing multimedia data, a provider of the multimedia data determines a time period within which the multimedia data is to be displayed and a display count of displaying the multimedia data within the time period, and therefore, a planning display count of each piece of multimedia data in each display area within a first preset time period may be acquired according to a time period within which each piece of multimedia data is to be displayed and a display count of displaying each piece of multimedia data within the time period within which each piece of multimedia data is to be displayed.

An example is used, in which a provider of advertisement A, when providing advertisement A, determines that a display count of displaying advertisement A within the entire day of March 5 is 750. Because advertisement A corresponds to the display areas of 3 provinces, a total count of displaying advertisement A is evenly distributed to 3 provinces corresponding to advertisement A, so that it is determined that within the entire day of March 5, a planning display count of advertisement A in Liaoning Province is 750/3=250, a planning display count of advertisement A in Shandong Province is 750/3=250, and a planning display count of advertisement A in Jilin Province is 750/3=250.

Certainly, the total display count of displaying advertisement A may also be distributed, according to other distribution principles, to display areas corresponding to advertisement A, and a specific principle of distributing the total display count of displaying advertisement A to display areas corresponding to advertisement A is not limited in this embodiment. A planning display count of each piece of multimedia data in each display area within a first time period may further be acquired in other manners, and a specific manner of acquiring a planning display count of each piece of multimedia data in each display area within the first time period is not limited in this embodiment. The total display count of displaying advertisement A, which is determined by the provider of advertisement A when the provider provides advertisement A, within a current day when the display control method for multimedia data provided in this embodiment is used to control display of multimedia data may also be another value. A specific value of the total display count of displaying advertisement A, which is determined by the provider of advertisement A when the provider provides advertisement A, within a current day when the display control method for multimedia data provided in this embodiment is used to control display is not limited in this embodiment.

In addition, a specific manner of acquiring the real display count of each piece of multimedia data in each display area within the first time period is also not limited in this embodiment. For example, a data storage device stores in real time the real display count of each piece of multimedia data in each area at current time, and therefore, the real display count of each piece of multimedia data in each display area within the first time period stored by the data storage device is acquired.

For example, as shown in FIG. 1, a data processing server 101 acquires from a data storage server 102 that within the entire day of March 5, a real display count of advertisement A in Liaoning Province is 350, a real display count of advertisement A in Shandong Province is 250, and a real display count of advertisement A in Jilin Province is 150.

Certainly, the real display count of advertisement A in Liaoning Province or advertisement A in Shandong Province or advertisement A in Jilin Province within March 5 may also be another count, and a specific real display count of advertisement A in Liaoning Province or advertisement A in Shandong Province or advertisement A in Jilin Province within March 5 is not limited in this embodiment.

303: Acquire, according to the real display counts of all multimedia data in each display area within the first time period, a total real display count corresponding to each display area within the first time period, and acquire, according to the planning display counts of all multimedia data in each display area within the first time period, a total planning display count corresponding to each display area within the first time period.

For example, the real display counts of each advertisement in Liaoning Province, Shandong Province, and Jilin Province within the entire day of March 5 are shown in Table 2:

TABLE 2

| Multimedia data | Real display counts of each advertisement in Liaoning Province, Shandong Province, and Jilin Province | | |
|---|---|---|---|
| | Liaoning | Shandong | Jilin |
| Advertisement A | 350 | 250 | 150 |
| Advertisement B | None | 30 | 300 |
| Advertisement C | 2000 | 1350 | 400 |
| Total real display count | 2350 | 1630 | 850 |

The real display counts of each advertisement in Liaoning Province, Shandong Province, and Jilin Province within the entire day of March 5 are added to obtain that within the entire day of March 5, a total real display count corresponding to Liaoning Province is 2350, a total real display count corresponding to Shandong Province is 1630, and a total real display count corresponding to Jilin Province is 850.

The planning display counts of each advertisement in Liaoning Province, Shandong Province, and Jilin Province within the entire day of March 5 are shown in Table 3:

TABLE 3

| Multimedia data | Planning display counts of each advertisement in Liaoning Province, Shandong Province, and Jilin Province | | |
|---|---|---|---|
| | Liaoning | Shandong | Jilin |
| Advertisement A | 250 | 250 | 250 |
| Advertisement B | None | 200 | 300 |
| Advertisement C | 1850 | 1350 | 1150 |
| Total planning display count | 2100 | 1800 | 1700 |

The planning display counts of each advertisement in Liaoning Province, Shandong Province, and Jilin Province within the entire day of March 5 are added to obtain that within the entire day of March 5, a total planning display count corresponding to Liaoning Province is 2100, a total planning display count corresponding to Shandong Province is 1800, and a total planning display count corresponding to Jilin Province is 1700.

304: Determine a ratio of the total real display count to the total planning display count corresponding to each display area within the first time period as a data display rate of each display area within the first time period.

The example in step 303 is still used as an example, and the ratio 112% of the total real display count 2350 to the total planning display count 2100 corresponding to Liaoning Province within the entire day of March 5 is determined as a data display rate of Liaoning Province on March 5. Similarly, it is obtained that a data display rate of Shandong Province on March 5 is 1630/1800=91%, and a data display rate of Jilin Province on March 5 is 850/1700=50%.

305: Control, according to the data display rate of each display area within the first time period, multimedia data displayed in each display area.

A specific method of controlling, according to the data display rate of each display area within the first time period, multimedia data displayed in each display area is not limited in this embodiment. For example, control of multimedia data displayed in each display area is implemented in a manner of displaying the data display rate of each display area within the first time period on a map presentation page, and specifically may be implemented by using three steps as follows.

Figures 4, 5:
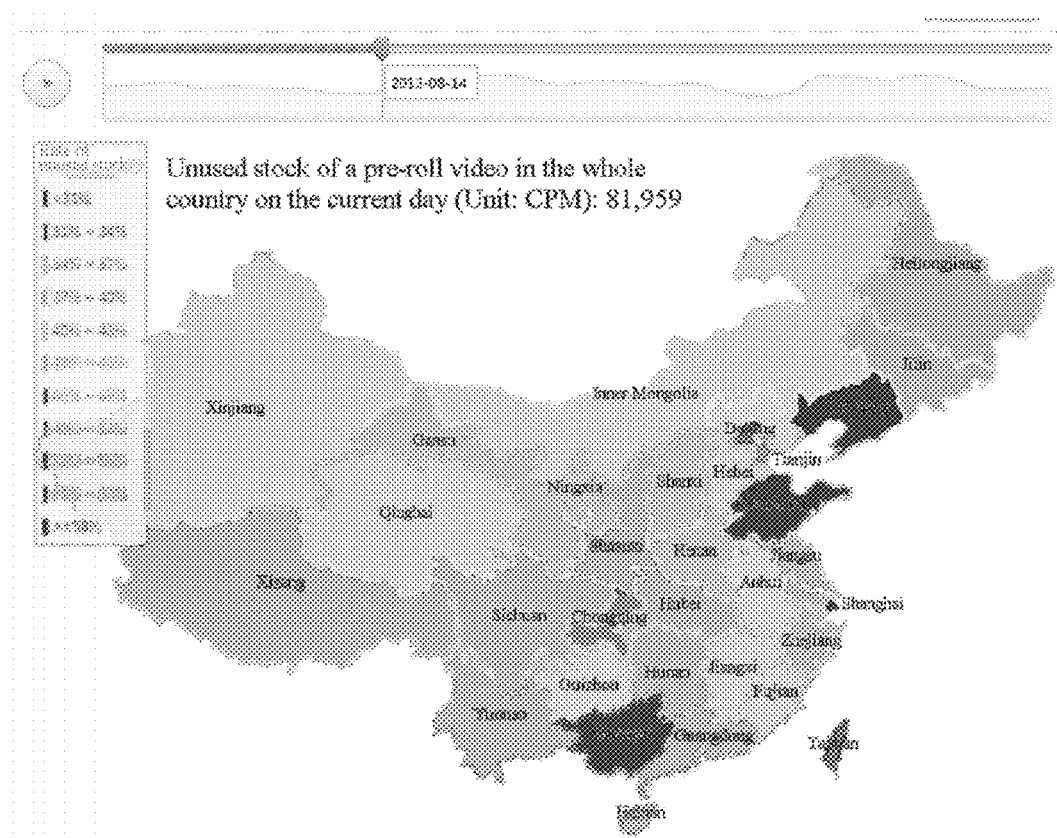
FIG. 4 is a schematic diagram of a display of a name corresponding to each display area provided in Embodiment 2 of the present invention.
FIG. 5 is a schematic diagram of another display of a name corresponding to each display area provided in Embodiment 2 of the present invention.

First step: Determine, according to a geographical location of each display area, a presentation area of each display area on the map presentation page, and display, in the presentation area of each display area on the map presentation page, a name corresponding to each display area;

A specific manner of displaying, in the presentation area of each display area on the map presentation page, a name corresponding to each display area is not limited in this embodiment. For example, a display manner of displaying, in a presentation area of each display area on a map presentation page, a name corresponding to each display area is shown in FIG. 4. Alternatively, a display manner of displaying, in an area that is pointed by a straight line from a presentation area of each display area on a map presentation page and is outside the presentation area of each display area on the map presentation page, a name corresponding to each display area is shown in FIG. 5.

Second step: Display, according to the data display rate of each display area within the first time period, a corresponding color in the presentation area of each display area on the map presentation page.

A specific method of displaying, according to the data display rate of each display area within the first time period, a corresponding color in the presentation area of each display area on the map presentation page is not limited in this embodiment. The method includes, but is not limited to: determining a second color corresponding to the data display rate of each display area within the first time period; and displaying the color in the presentation area of each display area on the map presentation page as the second color corresponding to the data display rate of each display area within the first time period.

A specific method of determining a second color corresponding to the data display rate of each display area within the first time period is not limited in this embodiment. For example, the method is: acquiring a preset table of a correspondence between a data display rate and a color, and determining, according to the table of a correspondence between a data display rate and a color, the second color corresponding to the data display rate of each display area within the first time period.

The preset table of a correspondence between a data display rate and a color is shown in Table 4. An example is used, in which the data display rate of Liaoning Province on March 5 is 112%, the data display rate of Shandong Province on March 5 is 91%, and the data display rate of Jilin Province on March 5 is 50%. It is determined that the second color corresponding to the data display rate of Liaoning Province on March 5 is red, it is determined that the second color corresponding to the data display rate of Shandong Province on March 5 is green, and it is determined that the second color corresponding to the data display rate of Jilin Province on March 5 is orange.

TABLE 4

| Data display rate | Color |
| --- | --- |
| 95%-100% | Red |
| 55%-95% | Green |
| 0-55% | Orange |

Certainly, the preset table of a correspondence between a data display rate and a color may also have other forms and content, and a specific form and specific content of the preset table of a correspondence between a data display rate and a color are not limited in this embodiment.

Third step: Control, according to the color displayed in the presentation area of each display area on the map presentation page, multimedia data displayed in each display area.

A specific method of controlling, according to the color displayed in the presentation area of each display area on the map presentation page, multimedia data displayed in each display area is not limited in this embodiment. For example, for a presentation area whose color displayed on the map presentation page is red, a real display count of each piece of multimedia data in the display area is adjusted, or a display area corresponding to each piece of multimedia data in the display area is adjusted, so as to adjust a planning display count of each piece of multimedia data in the display area.

In addition, to enable a display control person of multimedia data to obtain a data display rate of each display area within a historical time period more rapidly, preferably, after the second step of displaying, according to the data display rate of each display area within the first time period, a corresponding color in the presentation area of each display area on the map presentation page in step 305 is performed, the map presentation page may further include an automatic play function for the data display rate of each display area within the historical time period. A specific implementation method of the automatic play function is not limited in this embodiment, and is, for example: acquiring, after the automatic play function is selected, start time and end time of the automatic play function; dividing a time period corresponding to the start time to the end time into at least two sub-time periods; determining a data display rate of each display area within each sub-time period, and determining a first color corresponding to the data display rate of each display area within each sub-time period; and selecting a sub-time period at an interval of a preset time on the basis of a time order of the sub-time periods, and displaying the color in the presentation area of each display area on the map presentation page as the first color corresponding to the data display rate of each display area within the selected sub-time period.

A specific method of determining a data display rate of each display area within each sub-time period is not limited in this embodiment, and is, for example: acquiring a real display count and a planning display count of each piece of multimedia data in each display area within each sub-time period; acquiring, according to the real display counts of all multimedia data in each display area within each sub-time period, a total real display count corresponding to each display area within each sub-time period, and acquiring, according to the planning display counts of all multimedia data in each display area within each sub-time period, a total planning display count corresponding to each display area within each sub-time period; and determining a ratio of the total real display count to the total planning display count corresponding to each display area within each sub-time period as the data display rate of each display area within each sub-time period.

A specific method of determining a first color corresponding to the data display rate of each display area within each sub-time period is also not limited in this embodiment, and is, for example: determining, according to a table of a correspondence between a data display rate and a color, a first color corresponding to a data display rate of each display area within each sub-time period.

An example is used, in which the display area is Liaoning Province, the time period corresponding to the start time to the end time is divided into three sub-time periods, the first color corresponding to the data display rate of Liaoning Province within the earliest sub-time period is red, the first color corresponding to the data display rate of Liaoning Province within the middle sub-time period is green, the first color corresponding to the data display rate of Liaoning Province within the latest sub-time period is orange, and the preset time is 0.1 second. After 0.1 second, the earliest sub-time period is selected on the basis of the time order of the sub-time periods, and the color of the presentation area of Liaoning Province on the map presentation page is displayed as red. After 0.2 second, the middlemost sub-time period is selected on the basis of the time order of the sub-time periods, and the color of the presentation area of Liaoning Province on the map presentation page is displayed as green. After 0.3 second, the latest sub-time period is selected on the basis of the time order of the sub-time periods, and the color of the presentation area of Liaoning Province on the map presentation page is displayed as orange.

Moreover, to enable a display control person of multimedia data to obtain the data display rate of each display area within the first time period more rapidly, preferably, after the second step of displaying, according to the data display rate of each display area within the first time period, a corresponding color in the presentation area of each display area on the map presentation page in step 305 is performed, the data display rate of any display area within the first time period may be further presented in detail.

A specific condition of triggering presentation of the data display rate of any display area within the first time period is not limited this embodiment, and includes, but is not limited to: triggering, after a presentation area of any display area on the map presentation page is selected, to present the data display rate of the any display area within the first time period.

A specific standard for determining whether the presentation area of any display area on the map presentation page is selected is also not limited in this embodiment, and is, for example: determining, when the presentation area of any display area on the map presentation page is clicked, that the presentation area of the any display area on the map presentation page is selected; and for another example: determining, when a mouse cursor slide through the presentation area of any display area on the map presentation page, that the presentation area of the any display area on the map presentation page is selected.

A specific manner of presenting the data display rate of any display area within the first time period is also not limited in this embodiment, and is, for example: determining, after a presentation area of any display area on the map presentation page is selected, to present a detail page of the data display rate of the any display area within the first time period, and presenting, in the detail page, the data display rate of the any display area within the first time period.

Figure 6:
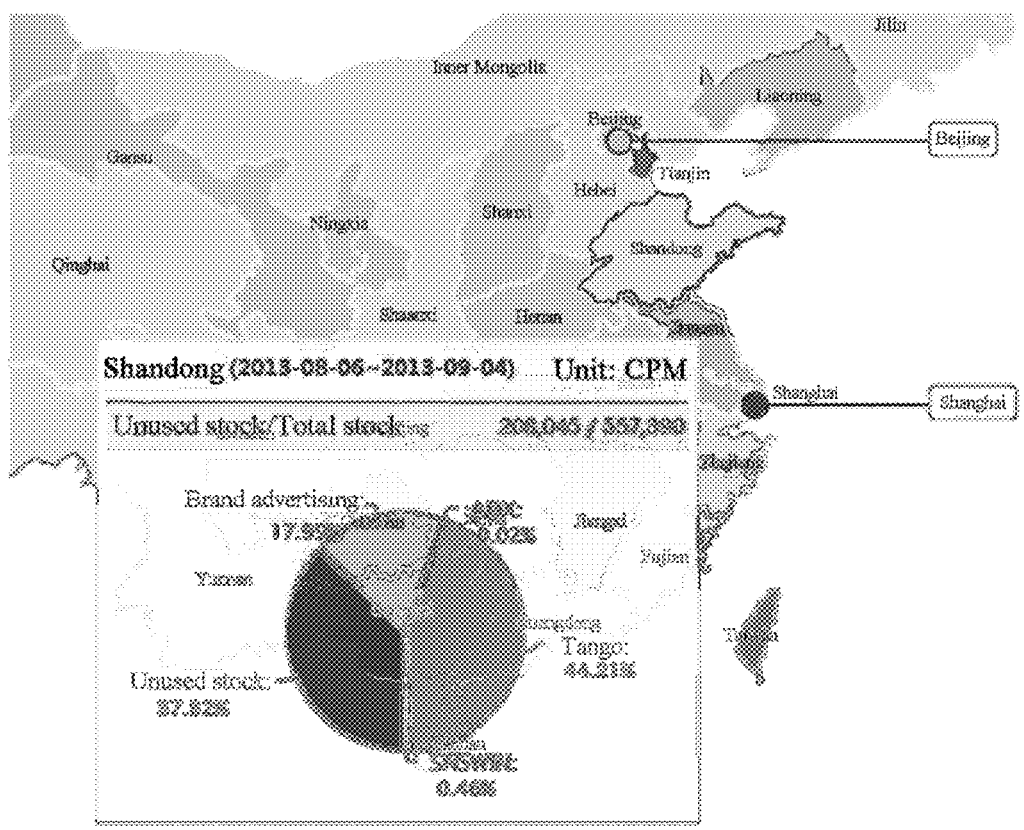
FIG. 6 is a schematic diagram of a presentation of a data display rate of any display area within a first time period provided in Embodiment 2 of the present invention.
Figure 7:
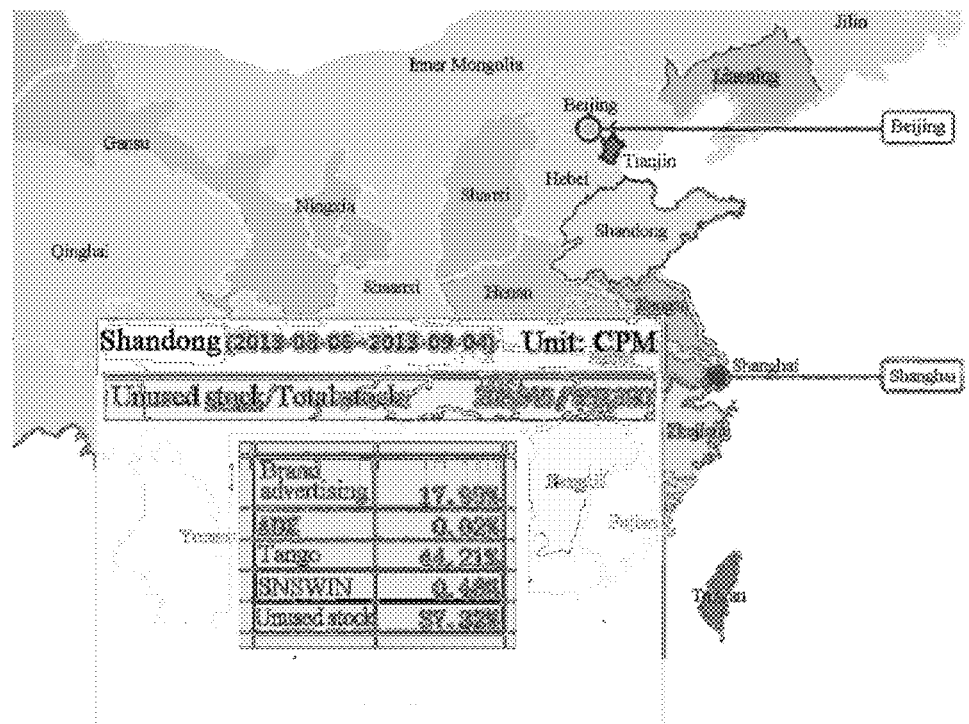
FIG. 7 is a schematic diagram of another presentation of a data display rate of any display area within a first time period provided in Embodiment 2 of the present invention.

The detail page for presenting the data display rate of any display area within the first time period may be a map presentation page, or may also be another page, and a specific detail page for presenting the data display rate of any display area within the first time period is not limited in this embodiment. A presentation method for presenting, in the detail page, the data display rate of the any display area within the first time period may be that, as shown in FIG. 6, the data display rate of the any display area within the first time period is presented in the detail page in a graphical manner, or may also be that, as shown in FIG. 7, the data display rate of the any display area within the first time period is presented in the detail page in a manner of a report form; a specific presentation method of presenting, in the detail page, the data display rate of the any display area within the first time period is not limited in this embodiment. In the detail page, in addition to presenting the data display rate of any display area within the first time period, other information corresponding to the any display area may further be presented, and specific content presented in the detail page is not limited in this embodiment.

306: Determine, according to the data display rate of each display area within the first time period, a display area meeting a precautionary condition.

A specific method of determining, according to the data display rate of each display area within the first time period, a display area meeting a precautionary condition is not limited in this embodiment, and includes, but is not limited to, determining a display area meeting a precautionary condition by using three steps as follows.

Step 1: Acquire a precautionary range corresponding to each display area within the first time period.

A specific manner of acquiring a precautionary range corresponding to each display area within the first time period is not limited in this embodiment. For example, because a fluctuating trend of the data display rate of each display area within a historical time period before the first time period may reflect the trend of the data display rate of each display area within the first time period, the data display rates of each display area within at least two consecutive second time periods before the first time period may be acquired, and the precautionary range corresponding to each display area within the first time period is acquired according to the data display rate of each display area within each second time period.

During a specific implementation of the implementation manner of acquiring the precautionary range corresponding to each display area within the first time period in the foregoing example, a specific method of acquiring the data display rates of each display area within at least two consecutive second time periods before the first time period is not limited in this embodiment, and is, for example: first acquiring real display counts and planning display counts of multimedia data in each display area within at least two consecutive second time periods; then acquiring, according to the real display count of each piece of multimedia data in each display area within each second preset time period, a total real display count corresponding to each display area within each second time period, and acquiring, according to the planning display count of each piece of multimedia data in each display area within each second preset time period, a total planning display count corresponding to each display area within each second time period; and finally determining a ratio of the total real display count to the total planning display count corresponding to each display area within each second time period as a data display rate of each display area within each second time period. The second time periods are time periods before the first time period.

To enable the obtained data display rate of each display area within each second time period to reflect a trend of the data display rate of each display area within the first time period more accurately, and make a precautionary result, which is acquired according to the data display rate of each display area within each second time period, of taking a precaution in the precautionary range corresponding to each display area within the first time period more accurate, preferably, a duration of the second time period may be the same as a duration of the first time period. For example, the first time period is the entire day of March 5, and the duration of the first time period is 24 hours, and the duration of the second time period is also 24 hours.

During a specific implementation of the implementation manner of acquiring the precautionary range corresponding to each display area within the first time period in the foregoing example, a specific method of acquiring, according to the data display rate of each display area within each second time period, the precautionary range corresponding to each display area within the first time period is also not limited in this embodiment, and is, for example: determining, according to the data display rate of each display area within each second time period, a maximum precautionary threshold and a minimum precautionary threshold corresponding to each display area within the second time period; and determining a range between the maximum precautionary threshold and the minimum precautionary threshold corresponding to each display area within the second time period as the precautionary range corresponding to each display area within the first time period.

Specifically, a specific manner of determining, according to the data display rate of each display area within each second time period, a maximum precautionary threshold and a minimum precautionary threshold corresponding to each display area within the second time period is not limited in this embodiment, and for example, includes, but is not limited to, several implementation manners:

Implementation manner 1: Determine a maximum data display rate of the data display rate of each display area within each second time period as the maximum precautionary threshold corresponding to each display area within the second time period; and determine a minimum data display rate of the data display rate of each display area within each second time period as the minimum precautionary threshold corresponding to each display area within the second time period.

Implementation manner 2: Determine, according to the data display rate of each display area within each second time period, an average data display rate of each display area within the second time period; determine a sum of the average data display rate and a preset threshold as the maximum precautionary threshold corresponding to each display area within the second time period; and determine a difference between the average data display rate and the preset threshold as the minimum precautionary threshold corresponding to each display area within the second time period.

An example is used, in which the second time periods are the entire day of March 4, the entire day of March 3, and the entire day of March 2, the data display rate of each display area within each second time period is shown in Table 5, and the preset threshold is 20%.

TABLE 5

| Display area | Data display rate of each display area within each second time period | | |
|---|---|---|---|
| | Entire day of March 4 | Entire day of March 3 | Entire day of March 2 |
| Liaoning Province | 90% | 70% | 55% |
| Shandong Province | 60% | 79% | 90% |
| Jilin Province | 65% | 88% | 78% |

For implementation manner 1, the maximum data display rate 90% of the data display rate of Liaoning Province within each second time period is determined as the maximum precautionary threshold corresponding to Liaoning Province within the second time period; the minimum data display rate 55% of the data display rate of Liaoning Province within each second time period is determined as the minimum precautionary threshold corresponding to Liaoning Province within the second time period. Similarly, it is determined that the maximum precautionary threshold corresponding to Shandong Province within the second time period is 90%, and the minimum precautionary threshold corresponding to Shandong Province within the second time period is 60%; it is determined that the maximum precautionary threshold corresponding to Jilin Province within the second time period is 88%, and the minimum precautionary threshold corresponding to Jilin Province within the second time period is 65%.

For implementation manner 2, it is determined according to the data display rate of Liaoning Province within each second time period that an average data display rate of Liaoning Province within the second time period is (90%+80%+55)/3=72%, and a sum 92% of 72% and 20% is determined as the maximum precautionary threshold corresponding to Liaoning Province within the second time period; a difference 20% between 52% of 72% is determined as the corresponding minimum precautionary threshold within the second time period. Similarly, it is determined that the maximum precautionary threshold corresponding to Shandong Province within the second time period is 96%, and the minimum precautionary threshold corresponding to Shandong Province within the second time period is 56%; it is determined that the maximum precautionary threshold corresponding to Jilin Province within the second time period is 97%, and the minimum precautionary threshold corresponding to Jilin Province within the second time period is 57%.

It should be noted that, to reduce time for obtaining a precautionary range, during a specific implementation of the step of determining, according to the data display rate of each display area within each second time period, a maximum precautionary threshold and a minimum precautionary threshold corresponding to each display area within the second time period, in addition to the separately determining the maximum precautionary threshold and the minimum precautionary threshold corresponding to the display area within the second time period according to the data display rate of each display area within each second time period, maximum precautionary thresholds and minimum precautionary thresholds corresponding to all display areas within the second time period may further be determined according to the data display rates of all display areas within each second time period; the determined maximum precautionary thresholds are separately used as the maximum precautionary thresholds corresponding to each display area within the second time periods, and the determined minimum precautionary thresholds are separately used as the minimum precautionary thresholds corresponding to each display area within the second time periods.

The example is still used, in which the second time periods are the entire day of March 4, the entire day of March 3, and the entire day of March 2, the data display rate of each display area within each second time period is shown in Table 5, and the preset threshold is 20%.

If the specific implementation manner of determining, according to the data display rate of each display area within each second time period, a maximum precautionary threshold and a minimum precautionary threshold corresponding to each display area within the second time period is implementation manner 1, a maximum data display rate 90% and a minimum data display rate 55% corresponding to Liaoning Province, Shandong Province, and Jilin Province within the second time period are determined according to all the data display rates of Liaoning Province, Shandong Province, and Jilin Province within each second time period; 90% is used as the maximum precautionary threshold corresponding to Liaoning Province, Shandong Province, and Jilin Province within the second time period, and 55% is used as the minimum precautionary threshold corresponding to Liaoning Province, Shandong Province, and Jilin Province within the second time period; and 90% is separately used as the maximum precautionary threshold corresponding to Liaoning Province, Shandong Province, and Jilin Province within the second time period, and 55% is separately used as the minimum precautionary threshold corresponding to each display area within the second time period.

If the specific implementation manner of determining, according to the data display rate of each display area within each second time period, a maximum precautionary threshold and a minimum precautionary threshold corresponding to each display area within the second time period is implementation manner 2, an average data display rate of Liaoning Province, Shandong Province, and Jilin Province within the second time period is determined as (90%+70%+55%+60%+79%+90%+65%+88%+78%)/9=75% according to all the data display rates of Liaoning Province, Shandong Province, and Jilin Province within each second time period; 75%+20%=95% is used as the maximum precautionary threshold corresponding to Liaoning Province, Shandong Province, and Jilin Province within the second time period, and 75%-20%=55% is used as the minimum precautionary threshold corresponding to Liaoning Province, Shandong Province, and Jilin Province within the second time period; and 95% is separately used as the maximum precautionary threshold corresponding to Liaoning Province, Shandong Province, and Jilin Province within the second time period, and 55% is separately used as the minimum precautionary threshold corresponding to each display area within the second time period.

In addition, for implementation manner 2, because each display area has a different property such as regional culture, a display rate of displaying same multimedia data in each display area is different. To reflect a different display rate of each display area caused by a different property of each display area, a preset threshold corresponding to each display area may be preset for each display area, and when the maximum precautionary threshold and the minimum precautionary threshold are determined, a sum of the average data display rate and the preset threshold corresponding to each display area may be determined as the maximum precautionary threshold corresponding to each display area within the second time period; and a difference between the average data display rate and the preset threshold corresponding to each display area is determined as the minimum precautionary threshold corresponding to each display area within the second time period.

Moreover, when the method provided in this embodiment is performed, step 1 does not need to be performed every time. That is, the step is performed when the display control method for multimedia data provided in this embodiment is applied for the first time, and during subsequent control, the precautionary range corresponding to each display area within the first time period acquire in step 1 may be directly used, so as to continue to perform the following steps. However, at an interval of a preset time, step 1 may be performed again to update the precautionary range corresponding to each display area within the first time period. The preset time may be any time length; a specific value of the preset time is not limited in this embodiment, and a specific condition of triggering performing of step 1 again is also not limited in this embodiment.

Step 2: Determine whether the data display rate of each display area within the first time period is in the precautionary range corresponding to each display area within the first time period.

An example is used, in which the data display rate of Liaoning Province on March 5 is 112%, the data display rate of Shandong Province on March 5 is 91%, the data display rate of Jilin Province on March 5 is 50%, and the precautionary ranges corresponding to Liaoning Province, Shandong Province, and Jilin Province on March 5 are all a range of 55%-95%. It is determined that the data display rate of Liaoning Province on March 5 is outside the precautionary range corresponding to Liaoning Province on March 5, the data display rate of Shandong Province on March 5 is inside the precautionary range corresponding to Shandong Province on March 5, and the data display rate of Jilin Province on March 5 is outside the precautionary range corresponding to Jilin Province on March 5.

Step 3: If the data display rate of any display area within the first time period is outside the precautionary range corresponding to any display area within the first time period, determine the any display area as the display area meeting the precautionary condition.

The example in step 2 is still used as an example, and Liaoning Province and Jilin Province are determined as the display areas meeting the precautionary condition.

307: Send, if at least one display area meets the precautionary condition, a precautionary alarm to the display area meeting the precautionary condition.

A specific manner of sending a precautionary alarm to the display area meeting the precautionary condition is not limited in this embodiment, and includes, but is not limited to: acquiring a contact manner corresponding to each display area meeting the precautionary condition, and separately sending, by using the contact manner corresponding to each display area meeting the precautionary condition, the precautionary alarm to the display area meeting the precautionary condition.

For example, it is acquired that the contact manner corresponding to Liaoning Province is an email address: . . . @ . . . , and the precautionary alarm is sent to Liaoning Province in a manner of sending an email to the email address. It is acquired that the contact manner corresponding to Jilin Province is a mobile phone number 11111111111, the precautionary alarm is sent to Jilin Province in a manner of sending a short message to the mobile phone number.

Certainly, the contact manner corresponding to the display area meeting the precautionary condition may further be another manner, and a specific contact manner corresponding to the display area meeting the precautionary condition is not limited in this embodiment. The display area meeting the precautionary condition may further correspond to multiple contact manners, and a specific quantity of the contact manners corresponding to the display area meeting the precautionary condition is not limited in this embodiment.

In addition, after receiving the precautionary alarm in a corresponding contact manner, a display control person of multimedia data of the display area meeting the precautionary condition may determine, according to the precautionary alarm, a corresponding processing measure, so as to avoid that, when the display area meeting the precautionary condition is controlled by using the display control method for multimedia data provided in the embodiment of the present invention after the first time period, the display area meeting the precautionary condition meets the precautionary condition again because the data display rate is excessively high or excessively low, resulting in that a precautionary alarm is sent.

The precautionary alarm is that the data display rate of the display area meeting the precautionary condition within the first time period is higher than the precautionary range corresponding to the display area meeting the precautionary condition within the first time period, or the data display rate of the display area meeting the precautionary condition within the first time period is lower than the precautionary range corresponding to the display area meeting the precautionary condition within the first time period, or other content that can reflect a precautionary reason corresponding to the display area meeting the precautionary condition, and specific content of the precautionary alarm is not limited in this embodiment.

A corresponding processing measure includes adjusting a real display count of each piece of multimedia data in the display area meeting the precautionary condition, or adjusting a display area corresponding to each piece of multimedia data in the display area meeting the precautionary condition, so as to adjust a planning display count of each piece of multimedia data in the display area meeting the precautionary condition, or other specific measures that can solve the precautionary reason in the precautionary alarm, and specific content of the corresponding processing measure is not limited in this embodiment.

To enable the display control person of multimedia data in the display area meeting the precautionary condition to determine the display area meeting the precautionary condition in a more intuitive and faster manner, preferably, after step 307 is performed, the display area meeting the precautionary condition may further be displayed on the map presentation page by using step 308 and step 309 in the following.

308: Determine a presentation area of each display area meeting the precautionary condition on a map presentation page.

Specifically, a presentation area of each display area meeting the precautionary condition on the map presentation page is determined, according to a geographical location of each display area meeting the precautionary condition, from a presentation area of each display area on the map presentation page.

309: Display an edge color of the presentation area of each display area meeting the precautionary condition on the map presentation page as a preset color.

It should be noted that, in addition to presenting name and edge information of each display area, the map presentation page may further present other information such as a preset table of a correspondence between a data display rate and a color, and specific content presented on the map presentation page is not limited in this embodiment.

In addition, the display control person of multimedia data of each display area may learn, from a color corresponding to each display area on the map presentation page or an edge color of the presentation area of each display area on the map presentation page, whether each display area meets the precautionary condition. The display control person of multimedia data of the display area meeting the precautionary condition may determine, according to the data display rate of the display area meeting the precautionary condition within the first time period, a corresponding processing measure, so as to avoid that, when the display area meeting the precautionary condition is controlled by using the display control method for multimedia data provided in the embodiment of the present invention after the first time period, the display area meeting the precautionary condition meets the precautionary condition again because the data display rate is excessively high or excessively low, resulting in that a precautionary alarm is sent.

Moreover, only an example is used in this embodiment, in which display areas are Liaoning Province, Shandong Province, and Jilin Province, multimedia data includes advertisement A, advertisement B, and advertisement C, where advertisement A and advertisement C both correspond to display areas of Liaoning Province, Shandong Province, and Jilin Province, and advertisement B corresponds to display areas of Shandong Province and Jilin Province, and a first preset time period is the entire day of March 5. Besides, the display area may further be other areas, and a specific name of the display area is not limited in this embodiment. The quantity of display areas may further be another quantity, and a specific quantity of display areas is not limited in this embodiment. The name of multimedia data may further be another name, and a specific name of multimedia data is not limited in this embodiment. The quantity of multimedia data may further be another quantity, and a specific quantity of multimedia data is not limited in this embodiment. A correspondence between multimedia data and a display area may further be another correspondence, and a specific correspondence between multimedia data and a display area is not limited in this embodiment. The first preset time period may further be another time period, and a specific time period of the first preset time period is not limited in this embodiment.

In the method provided in this embodiment, a data display rate of each display area within a first time period is acquired, and multimedia data displayed in each display area is controlled according to the data display rate of each display area within the first time period, so that stability of accuracy of a control result and a control effect are improved. In addition, the data display rate of each display area within the first time period is presented on a map presentation page, thereby improving intuitiveness for controlling multimedia data displayed in each display area, and enhancing a display effect of multimedia data.

Embodiment 3

Figure 8:
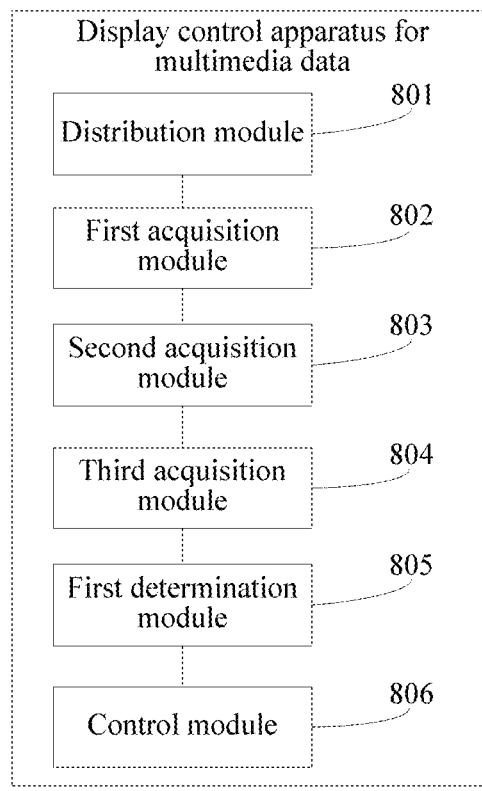
FIG. 8 is a schematic structural diagram of a first display control apparatus for multimedia data provided in Embodiment 3 of the present invention.

The embodiment of the present invention further provides a display control apparatus for multimedia data. The apparatus is configured to perform the display control method for multimedia data provided in Embodiment 1 or Embodiment 2 in the foregoing. Referring to FIG. 8, the apparatus includes:

a distribution module 801, configured to distribute each piece of multimedia data to a corresponding display area;

a first acquisition module 802, configured to acquire a real display count and a planning display count of each piece of multimedia data in each display area within a first time period;

a second acquisition module 803, configured to acquire, according to the real display counts of all multimedia data in each display area within the first time period acquired by the first acquisition module 802, a total real display count corresponding to each display area within the first time period;

a third acquisition module 804, configured to acquire, according to the planning display counts of all multimedia data in each display area within the first time period acquired by the second acquisition module 803, a total planning display count corresponding to each display area within the first time period;

a first determination module 805, configured to determine a ratio of the total real display count to the total planning display count corresponding to each display area within the first time period as a data display rate of each display area within the first time period; and a control module 806, configured to control, according to the data display rate of each display area within the first time period determined by the first determination module 805, multimedia data displayed in each display area;

the display area being at least one, and any multimedia data corresponding to at least one display area.

Figure 9:
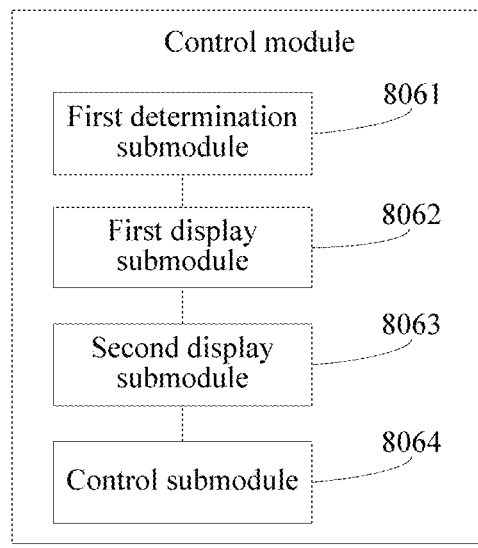
FIG. 9 is a schematic structural diagram of a control module provided in Embodiment 3 of the present invention.

Referring to FIG. 9, the control module 806 includes:

a first determination submodule 8061, configured to determine, according to a geographical location of each display area, a presentation area of each display area on a map presentation page;

a first display submodule 8062, configured to display, in the presentation area of each display area on the map presentation page, a name corresponding to each display area;

a second display submodule 8063, configured to display, according to the data display rate of each display area within the first time period, a corresponding color in the presentation area of each display area on the map presentation page; and a control submodule 8064, configured to control, according to the color displayed in the presentation area of each display area on the map presentation page, multimedia data displayed in each display area.

Figure 10:
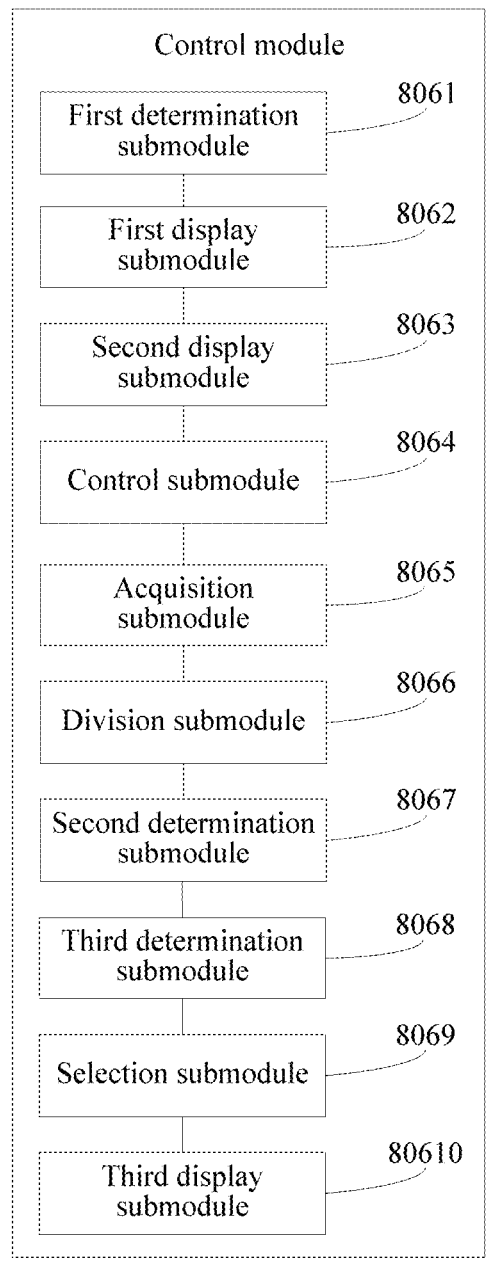
FIG. 10 is a schematic structural diagram of another control module provided in Embodiment 3 of the present invention.

Referring to FIG. 10, the map presentation page includes an automatic play function; and the control module 806 further includes:

an acquisition submodule 8065, configured to acquire, after the automatic play function is selected, start time and end time of the automatic play function;

a division submodule 8066, configured to divide a time period corresponding to the start time to the end time into at least two sub-time periods;

a second determination submodule 8067, configured to determine a data display rate of each display area within each sub-time period;

a third determination submodule 8068, configured to determine a first color corresponding to the data display rate of each display area within each sub-time period;

a selection submodule 8069, configured to select a sub-time period at an interval of a preset time on the basis of a time order of the sub-time periods; and a third display submodule 80610, configured to display the color in the presentation area of each display area on the map presentation page as the first color corresponding to the data display rate of each display area within the selected sub-time period.

Figure 11:
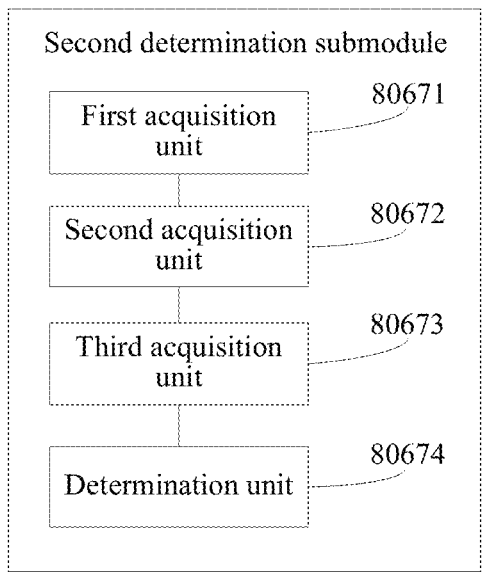
FIG. 11 is a schematic structural diagram of a second determination submodule provided in Embodiment 3 of the present invention.

Referring to FIG. 11, the second determination submodule 8067 includes:

a first acquisition unit 80671, configured to acquire a real display count and a planning display count of each piece of multimedia data in each display area within each sub-time period;

a second acquisition unit 80672, configured to acquire, according to the real display counts of all multimedia data in each display area within each sub-time period, a total real display count corresponding to each display area within each sub-time period;

a third acquisition unit 80673, configured to acquire, according to the planning display counts of all multimedia data in each display area within each sub-time period, a total planning display count corresponding to each display area within each sub-time period; and a determination unit 80674, configured to determine a ratio of the total real display count to the total planning display count corresponding to each display area within each sub-time period as the data display rate of each display area within each sub-time period.

Figure 12:
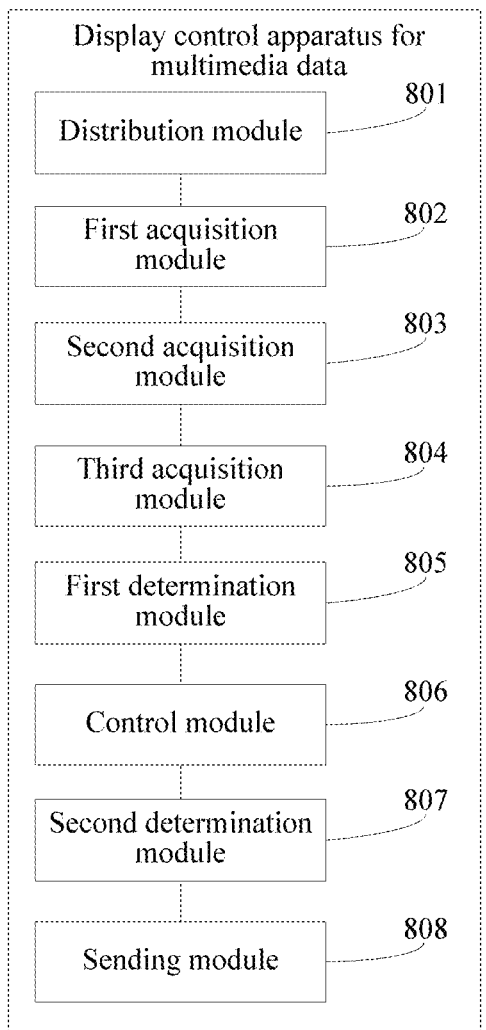
FIG. 12 is a schematic structural diagram of a second display control apparatus for multimedia data provided in Embodiment 3 of the present invention.

Referring to FIG. 12, the apparatus further includes:

a second determination module 807, configured to determine, according to the data display rate of each display area within the first time period, a display area meeting a precautionary condition; and a sending module 808, configured to send, when the second determination module 807 determines that at least one display area meets the precautionary condition, a precautionary alarm to the display area meeting the precautionary condition.

Figure 13:
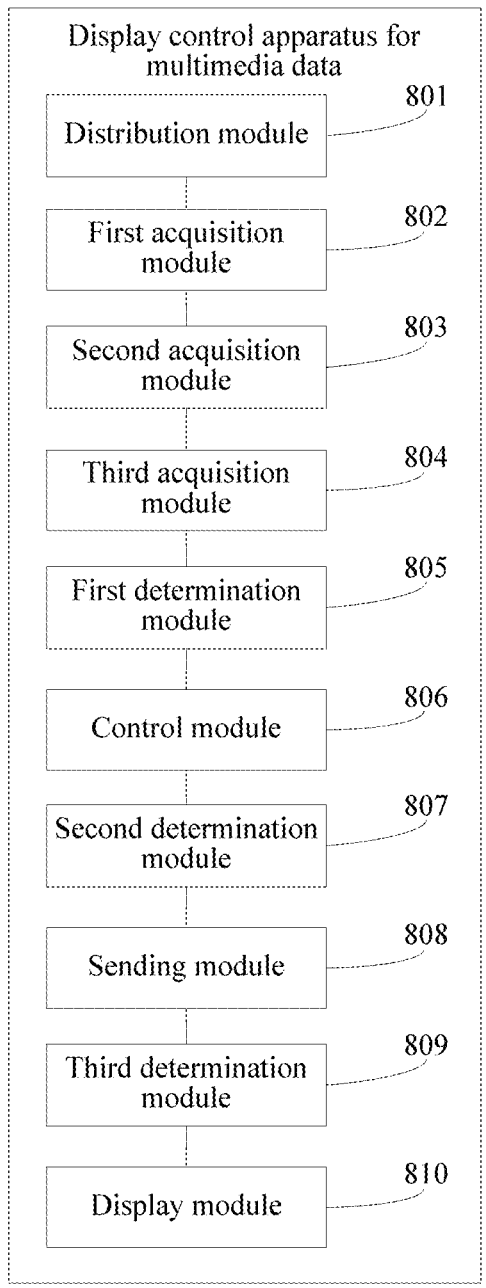
FIG. 13 is a schematic structural diagram of a third display control apparatus for multimedia data provided in Embodiment 3 of the present invention.

Referring to FIG. 13, the apparatus further includes:

a third determination module 809, configured to determine a presentation area of each display area meeting the precautionary condition on the map presentation page; and a display module 810, configured to display an edge color of the presentation area of each display area meeting the precautionary condition on the map presentation page as a preset color.

Figure 14:
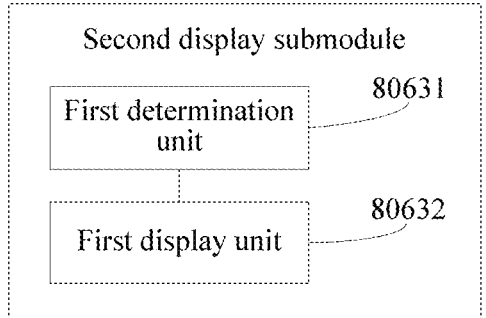
FIG. 14 is a schematic structural diagram of a second display submodule provided in Embodiment 3 of the present invention.

Referring to FIG. 14, the second display submodule 8063 includes:

a first determination unit 80631, configured to determine a second color corresponding to the data display rate of each display area within the first time period; and a first display unit 80632, configured to display the color in the presentation area of each display area on the map presentation page as the second color corresponding to the data display rate of each display area within the first time period determined by the first determination unit 80631.

Figure 15:
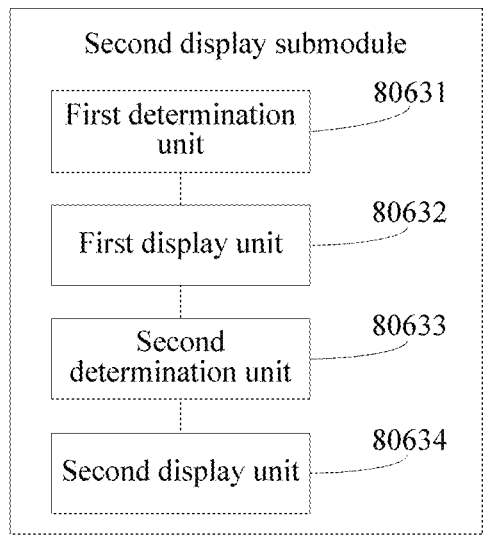
FIG. 15 is a schematic structural diagram of another second display submodule provided in Embodiment 3 of the present invention.

Referring to FIG. 15, the second display submodule 8063 further includes:

a second determination unit 80633, configured to determine, after a presentation area of any display area on the map presentation page is selected, to present a detail page of the data display rate of the any display area within the first time period; and a second display unit 80634, configured to present, in the detail page determined by the second determination unit 80633, the data display rate of the any display area within the first time period.

Figure 16:
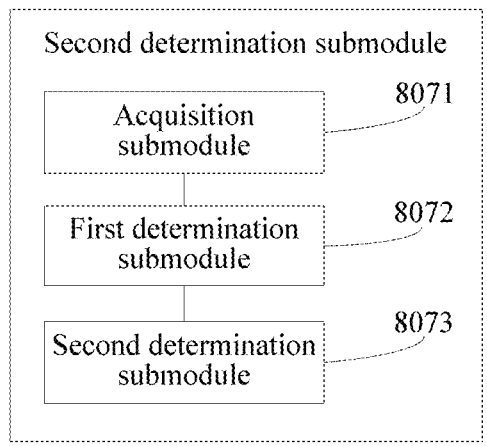
FIG. 16 is a schematic structural diagram of a second determination module provided in Embodiment 3 of the present invention.

Referring to FIG. 16, the second determination module 807 includes:

an acquisition submodule 8071, configured to acquire a precautionary range corresponding to each display area within the first time period;

a first determination submodule 8072, configured to determine whether the data display rate of each display area within the first time period is in the precautionary range corresponding to each display area within the first time period; and a second determination submodule 8073, configured to determine, when the data display rate of any display area within the first time period is outside the precautionary range corresponding to the any display area within the first time period, the any display area as the display area meeting the precautionary condition.

Figure 17:
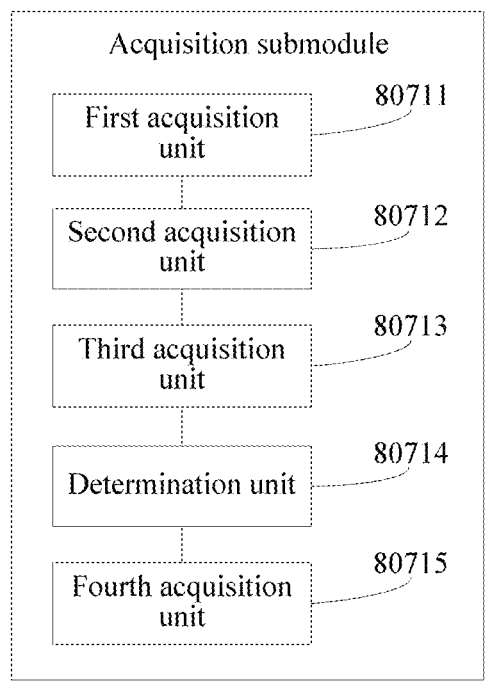
FIG. 17 is a schematic structural diagram of an acquisition submodule provided in Embodiment 3 of the present invention.

Referring to FIG. 17, the acquisition submodule 8071 includes:

a first acquisition unit 80711, configured to acquire real display counts and planning display counts of multimedia data in each display area within at least two consecutive second time periods, where the second time periods are time periods before the first time period;

a second acquisition unit 80712, configured to acquire, according to the real display count of each piece of multimedia data in each display area within each second preset time period acquired by the first acquisition unit 80711, a total real display count corresponding to each display area within each second time period;

a third acquisition unit 80713, configured to acquire, according to the planning display count of each piece of multimedia data in each display area within each second preset time period acquired by the first acquisition unit 80711, a total planning display count corresponding to each display area within each second time period;

a determination unit 80714, configured to determine a ratio of the total real display count to the total planning display count corresponding to each display area within each second time period as a data display rate of each display area within each second time period; and a fourth acquisition unit 80715, configured to acquire, according to the data display rate of each display area within each second time period determined by the determination unit 80714, the precautionary range corresponding to each display area within the first time period.

Figure 18:
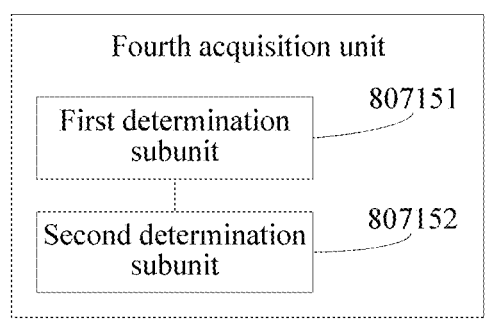
FIG. 18 is a schematic structural diagram of a fourth acquisition unit provided in Embodiment 3 of the present invention.

Referring to FIG. 18, the fourth acquisition unit 80715 includes:

a first determination subunit 807151, configured to determine, according to the data display rate of each display area within each second time period, a maximum precautionary threshold and a minimum precautionary threshold corresponding to each display area within the second time period; and a second determination subunit 807152, configured to determine a range between the maximum precautionary threshold and the minimum precautionary threshold corresponding to each display area within the second time period determined by the first determination subunit 807151, as the precautionary range corresponding to each display area within the first time period.

The first determination subunit 807151 is configured to determine a maximum data display rate of the data display rate of each display area within each second time period as the maximum precautionary threshold corresponding to each display area within the second time period; and determine a minimum data display rate of the data display rate of each display area within each second time period as the minimum precautionary threshold corresponding to each display area within the second time period.

Optionally, the first determination subunit 807151 is configured to determine, according to the data display rate of each display area within each second time period, an average data display rate of each display area within the second time period; determine a sum of the average data display rate and a preset threshold as the maximum precautionary threshold corresponding to each display area within the second time period; and determine a difference between the average data display rate and the preset threshold as the minimum precautionary threshold corresponding to each display area within the second time period.

In the apparatus provided in this embodiment, a data display rate of each display area within a first time period is acquired, and multimedia data displayed in each display area is controlled according to the data display rate of each display area within the first time period, so that stability of accuracy of a control result and a control effect are improved. In addition, the data display rate of each display area within the first time period is presented on a map presentation page, thereby improving intuitiveness for controlling multimedia data displayed in each display area, and enhancing a display effect of multimedia data.

Embodiment 4

Figure 19:
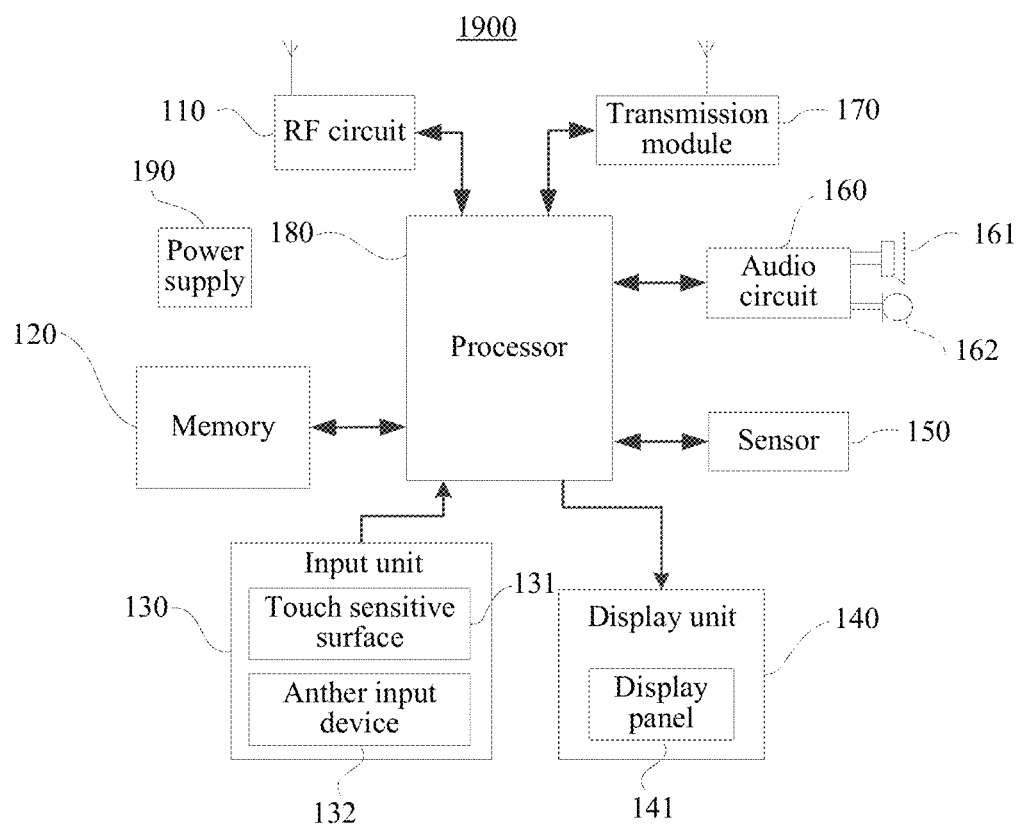
FIG. 19 is a schematic structural diagram of a terminal provided in Embodiment 4 of the present invention.

Referring to FIG. 19, the embodiment of the present invention further provides a terminal. FIG. 19 is a schematic structural diagram of a terminal having a touch sensitive surface involved in the embodiment of the present invention. The terminal may be configured to implement the display control method for multimedia data provided in the foregoing embodiment.

The terminal 1900 may include components such as a radio frequency (RF) circuit 110, a memory 120 including one or more computer readable storage media, an input unit 130, a display unit 140, a sensor 150, an audio circuit 160, a transmission module 170, a processor 180 including one or more processing cores, and a power supply 190. A person skilled in the prior art may understand that, the structure of the terminal shown in FIG. 19 does not constitute any limitation on the terminal, and may include components more or less than those shown in the figure, or a combination of some components, or different component layouts.

The RF circuit 110 may be used to receive and send information or receive and send a signal during a call, and in particular, after receiving downlink information of a base station, hand over the downlink information to one or more processors 180 for processing; and in addition, send related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LAN), and a duplexer. In addition, the RF circuit 110 may further communicate with a network and another device by using wireless communication. The wireless communication may use any communications standard or protocol, which includes, but is not limited to, a Global System for Mobile Communications (GSM), a General Packet Radio Service (GPRS), Code Division Multiple Access (CDMA), Wideband Code Division Multiple Access (WCDMA), Long Term Evolution (LTE), e-mail, a short messaging service (SMS), and the like.

The memory 120 may be configured to store a software program and a module, for example, software programs and modules corresponding to the display control apparatus for multimedia data in Embodiment 3. The processor 180 runs the software program and the module stored in the memory 120 to implement various functional applications and data processing. The memory 120 may mainly include a program storage area and a data storage area. The program storage area can store an operating system, an application program required by at least one function (such as a voice playback function and an image playback function), and the like. The data storage area may store data (such as audio data and an address book) created according to use of the terminal 1900. In addition, the memory 120 may include a high speed random access memory, and may also include a non-volatile memory, such as at least one magnetic disk storage device, a flash memory, or another volatile solid-state storage device. Accordingly, the memory 120 may further include a memory controller, so that the processor 180 and the input unit 130 access the memory 120.

The input unit 130 may be configured to receive input number or character information, and generate a keyboard, mouse, joystick, optical, or trackball signal input related to the user setting and function control. Specifically, the input unit 130 may include a touch sensitive surface 131 and another input device 132. The touch sensitive surface 131 may also be referred to as a touch display screen or a touch panel, and may collect a touch operation of a user on or near the touch sensitive surface (such as an operation on the touch sensitive surface 131 or near the touch sensitive surface 131 that are performed by a user by using any suitable object or attachment, such as a finger or a stylus), and drive a corresponding connection apparatus by using a preset program. Optionally, the touch sensitive surface 131 may include two parts: a touch detection apparatus and a touch controller. The touch detection apparatus detects a touch location input by a user, detects a signal generated by a touch operation, and sends the signal to the touch controller. The touch controller receives touch information from the touch detection apparatus, converts the touch information into contact coordinates, sends the contact coordinates to the processor 180, receives a command sent by the processor 180, and executes the command. In addition, the touch sensitive surface 131 may be implemented by using various types, such as a resistive type, a capacitive type, an infrared type, and a surface acoustic wave type. Besides the touch sensitive surface 131, the input unit 130 may further include the another input device 132. Specifically, the another input device 132 may include, but is not limited to, one or more of a physical keyboard, a functional key (such as a volume control key and a switch key), a trackball, a mouse, and a joystick.

The display unit 140 may be configured to display information input by a user or information provided to a user, and various graphical user interfaces of the terminal 1900, where these graphical user interfaces may be formed by a graph, a text, an icon, a video, and any combination thereof. The display unit 140 may include a display panel 141. Optionally, the display panel 141 may be configured in the form of a liquid crystal display (LCD), an organic light-emitting diode (OLED), or the like. Further, the touch sensitive surface 131 may cover the display panel 141. After detecting a touch operation on or near the touch sensitive surface 131, the touch sensitive surface 131 transfers the touch operation to the processor 180, so as to determine a type of a touch event. Subsequently, the processor 180 provides corresponding visual output on the display panel 141 according to the type of the touch event. In FIG. 19, the touch sensitive surface 131 and the display panel 141 are used as two separate parts to implement input and output functions; however, in some embodiments, the touch sensitive surface 131 and the display panel 141 may be integrated to implement the input and output functions.

The terminal 1900 may further include at least one sensor 150, for example, an optical sensor, a motion sensor, and other sensors. Specifically, the optical sensor may include an ambient light sensor and a proximity sensor, where the ambient light sensor may adjust the luminance of the display panel 141 according to brightness of the ambient light, and the proximity sensor may switch off the display panel 141 and/or backlight when the terminal 1900 is moved near an ear. As one type of the motion sensor, a gravity acceleration sensor may detect the magnitude of accelerations in various directions (which generally are triaxial), may detect the magnitude and direction of the gravity when the sensor is still, may be configured to identify an application of a mobile phone gesture (for example, switching between landscape and portrait modes, related games, and gesture calibration of a magnetometer), and a function related to vibration identification (such as a pedometer and a tap). Other sensors, for example, a gyroscope, a barometer, a hygrometer, a thermometer, and an infrared sensor, which may be configured in the terminal 1900 are not further described herein.

The audio circuit 160, a loudspeaker 161, and a microphone 162 may provide audio interfaces between the user and the terminal 1900. The audio circuit 160 may transmit, to the loudspeaker 161, a received electric signal converted from received audio data. The loudspeaker 161 converts the electrical signal into a sound signal for output. On the other hand, the microphone 162 converts a collected sound signal into an electrical signal. The audio circuit 160 receives the electrical signal and converts the electrical signal into audio data, outputs the audio data to the processor 180 for processing. Next, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1900.

The terminal 1900 may help, by using the transmission module 170, the user receive and send an e-mail, browse a webpage, access a streaming medium, and the like, and the transmission module 170 provides the user with wireless or wired broadband Internet access. Although FIG. 19 shows the transmission module 170, it may be understood that, the transmission module 170 is not an essential part of the terminal 1900, and can be completely omitted as required without changing the nature of the present disclosure.

The processor 180 is a control center of the terminal 1900, and connects various parts of a whole mobile phone by using various interfaces and circuits. By running or executing the software program and/or the module stored in the memory 120 and invoking data stored in the memory 120, the processor 180 performs various functions and data processing of the terminal 1900, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like, and the modem mainly processes wireless communication. It may be understood that, the foregoing modem may also be not integrated into the processor 180.

The terminal 1900 further includes the power supply 190 (such as a battery) for supplying power to the components. Preferably, the power supply may be logically connected to the processor 180 by using a power supply management system, thereby implementing functions such as charging, discharging, and power consumption management by using the power supply management system. The power supply 190 may further include any component, such as one or more direct current or alternate current power supplies, recharging systems, power supply fault detection circuits, power supply converters or inverters, and power supply state indicators.

Although not shown in the figure, the terminal 1900 may further include a camera, a Bluetooth module, and the like, which are not further described herein. Specifically, in this embodiment, the display unit of the terminal is a touch screen display, and the terminal further includes a memory and one or more programs. The one or more programs are stored in the memory, and configured to be executed by one or more processors. The one or more programs contain instructions which can be used to perform the following operations:

distributing each piece of multimedia data to a corresponding display area, and acquiring a real display count and a planning display count of each piece of multimedia data in each display area within a first time period;

acquiring, according to the real display counts of all multimedia data in each display area within the first time period, a total real display count corresponding to each display area within the first time period, and acquiring, according to the planning display counts of all multimedia data in each display area within the first time period, a total planning display count corresponding to each display area within the first time period; and determining a ratio of the total real display count to the total planning display count corresponding to each display area within the first time period as a data display rate of each display area within the first time period, and controlling, according to the data display rate of each display area within the first time period, multimedia data displayed in each display area;

the display area being at least one, and any multimedia data corresponding to at least one display area.

Various possible implementation manners share the same concept with the implementation manners provided in the method embodiments of the present invention, and reference may be made to the method embodiments for the specific implementation process of the implementation manners, which is no longer elaborated herein.

In conclusion, in the terminal provided in this embodiment, a data display rate of each display area within a first time period is acquired, and multimedia data displayed in each display area is controlled according to the data display rate of each display area within the first time period, so that stability of accuracy of a control result and a control effect are improved. In addition, the data display rate of each display area within the first time period is presented on a map presentation page, thereby improving intuitiveness for controlling multimedia data displayed in each display area, and enhancing a display effect of multimedia data.

Embodiment 5

The embodiment of the present invention further provides a computer readable storage medium, where the computer readable storage medium may be a computer readable storage medium included in a memory in the foregoing embodiment, or may also be a computer readable storage medium that exists separately and is not installed in a terminal. The computer readable storage medium stores one or more programs, and the one or more programs are used by one or more processors to perform a method of a processing object. The method includes:

distributing each piece of multimedia data to a corresponding display area, and acquiring a real display count and a planning display count of each piece of multimedia data in each display area within a first time period;

acquiring, according to the real display counts of all multimedia data in each display area within the first time period, a total real display count corresponding to each display area within the first time period, and acquiring, according to the planning display counts of all multimedia data in each display area within the first time period, a total planning display count corresponding to each display area within the first time period; and determining a ratio of the total real display count to the total planning display count corresponding to each display area within the first time period as a data display rate of each display area within the first time period, and controlling, according to the data display rate of each display area within the first time period, multimedia data displayed in each display area;

the display area being at least one, and any multimedia data corresponding to at least one display area.

Various possible implementation manners share the same concept with the implementation manners provided in the method embodiments of the present invention, and reference may be made to the method embodiments for the specific implementation process of the implementation manners, which is no longer elaborated herein.

In the computer readable storage medium provided in the embodiment of the present invention, a data display rate of each display area within a first time period is acquired, and multimedia data displayed in each display area is controlled according to the data display rate of each display area within the first time period, so that stability of accuracy of a control result and a control effect are improved. In addition, the data display rate of each display area within the first time period is presented on a map presentation page, thereby improving intuitiveness for controlling multimedia data displayed in each display area, and enhancing a display effect of multimedia data.

Embodiment 6

The embodiment of the present invention provides a graphical user interface, where the graphical user interface is used on a terminal, and the terminal includes a touch-screen display, a memory, and one or more processors configured to perform one or more programs. The graphical user interface includes:

distributing each piece of multimedia data to a corresponding display area, and acquiring a real display count and a planning display count of each piece of multimedia data in each display area within a first time period;

acquiring, according to the real display counts of all multimedia data in each display area within the first time period, a total real display count corresponding to each display area within the first time period, and acquiring, according to the planning display counts of all multimedia data in each display area within the first time period, a total planning display count corresponding to each display area within the first time period; and determining a ratio of the total real display count to the total planning display count corresponding to each display area within the first time period as a data display rate of each display area within the first time period, and controlling, according to the data display rate of each display area within the first time period, multimedia data displayed in each display area;

the display area being at least one, and any multimedia data corresponding to at least one display area.

In the graphical user interface provided in the embodiment of the present invention, a data display rate of each display area within a first time period is acquired, and multimedia data displayed in each display area is controlled according to the data display rate of each display area within the first time period, so that stability of accuracy of a control result and a control effect are improved. In addition, the data display rate of each display area within the first time period is presented on a map presentation page, thereby improving intuitiveness for controlling multimedia data displayed in each display area, and enhancing a display effect of multimedia data.

It should be noted that when the display control apparatus for multimedia data provided in the foregoing embodiments implements display control for multimedia data, the foregoing division of functional modules is only used as an example for description. In practical applications, the foregoing functions may be allocated to be accomplished by different functional modules according to needs, that is, the internal structure of the apparatus is divided into different functional modules to accomplish all or some of the functions described above. In addition, the display control apparatus for multimedia data in the foregoing embodiments share the same concept with the embodiments of the display control method for multimedia data, and reference may be made to the method embodiments for the specific implementation process of the apparatus, which is no longer elaborated herein.

The sequence numbers of the above embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A display control method for multimedia data, comprising:
    distributing each piece of multimedia data to a corresponding display area, and acquiring a real display count and a planning display count of each piece of multimedia data in each display area within a first time period;
    acquiring, according to the real display counts of all multimedia data in each display area within the first time period, a total real display count corresponding to each display area within the first time period, and acquiring, according to the planning display counts of all multimedia data in each display area within the first time period, a total planning display count corresponding to each display area within the first time period; and
    determining a ratio of the total real display count to the total planning display count corresponding to each display area within the first time period as a data display rate of each display area within the first time period, and controlling, according to the data display rate of each display area within the first time period, multimedia data displayed in each display area;
    the display area being at least one, and any multimedia data corresponding to at least one display area.

2. The method according to claim 1, wherein the controlling, according to the data display rate of each display area within the first time period, multimedia data displayed in each display area comprises:
    determining, according to a geographical location of each display area, a presentation area of each display area on a map presentation page, and displaying, in the presentation area of each display area on the map presentation page, a name corresponding to each display area; and
    displaying, according to the data display rate of each display area within the first time period, a corresponding color in the presentation area of each display area on the map presentation page, and controlling, according to the color displayed in the presentation area of each display area on the map presentation page, multimedia data displayed in each display area.

3. The method according to claim 2, wherein the map presentation page comprises an automatic play function; and
    after the displaying, according to the data display rate of each display area within the first time period, a corresponding color in the presentation area of each display area on the map presentation page, the method further comprises:
    acquiring, after the automatic play function is selected, start time and end time of the automatic play function;
    dividing a time period corresponding to the start time and the end time into at least two sub-time periods;
    determining a data display rate of each display area within each sub-time period, and determining a first color corresponding to the data display rate of each display area within each sub-time period; and
    selecting a sub-time period at an interval of a preset time on the basis of a time order of the sub-time periods, and displaying the color in the presentation area of each display area on the map presentation page as the first color corresponding to the data display rate of each display area within the selected sub-time period.

4. The method according to claim 3, wherein the determining a data display rate of each display area within each sub-time period comprises:
    acquiring a real display count and a planning display count of each piece of multimedia data in each display area within each sub-time period;
    acquiring, according to the real display counts of all multimedia data in each display area within each sub-time period, a total real display count corresponding to each display area within each sub-time period, and acquiring, according to the planning display counts of all multimedia data in each display area within each sub-time period, a total planning display count corresponding to each display area within each sub-time period; and
    determining a ratio of the total real display count to the total planning display count corresponding to each display area within each sub-time period as the data display rate of each display area within each sub-time period.

5. The method according to claim 2, wherein the displaying, according to the data display rate of each display area within the first time period, a corresponding color in the presentation area of each display area on the map presentation page comprises:
    determining a second color corresponding to the data display rate of each display area within the first time period; and
    displaying the color in the presentation area of each display area on the map presentation page as the second color corresponding to the data display rate of each display area within the first time period.

6. The method according to claim 5, after the displaying, according to the data display rate of each display area within the first time period, a corresponding color in the presentation area of each display area on the map presentation page, further comprising:
  determining, after a presentation area of any display area on the map presentation page is selected, to present a detail page of the data display rate of the any display area within the first time period, and presenting, in the detail page, the data display rate of the any display area within the first time period.

7. The method according to claim 1, after the controlling, according to the data display rate of each display area within the first time period, multimedia data displayed in each display area, further comprising:
  determining, according to the data display rate of each display area within the first time period, a display area meeting a precautionary condition; and
  sending, if at least one display area meets the precautionary condition, a precautionary alarm to the display area meeting the precautionary condition.

8. The method according to claim 7, after the sending a precautionary alarm to the display area meeting the precautionary condition, further comprising:
  determining a presentation area of each display area meeting the precautionary condition on the map presentation page; and
  displaying an edge color of the presentation area of each display area meeting the precautionary condition on the map presentation page as a preset color.

9. The method according to claim 7, wherein the determining, according to the data display rate of each display area within the first time period, a display area meeting a precautionary condition comprises:
  acquiring a precautionary range corresponding to each display area within the first time period, and determining whether the data display rate of each display area within the first time period is in the precautionary range corresponding to each display area within the first time period; and
  determining, if the data display rate of any display area within the first time period is outside the precautionary range corresponding to the any display area within the first time period, the any display area as the display area meeting the precautionary condition.

10. The method according to claim 9, wherein the acquiring a precautionary range corresponding to each display area within the first time period comprises:
  acquiring real display counts and planning display counts of multimedia data in each display area within at least two consecutive second time periods, wherein the second time periods are time periods before the first time period;
  acquiring, according to the real display count of each piece of multimedia data in each display area within each second preset time period, a total real display count corresponding to each display area within each second time period, and acquiring, according to the planning display count of each piece of multimedia data in each display area within each second preset time period, a total planning display count corresponding to each display area within each second time period;
  determining a ratio of the total real display count to the total planning display count corresponding to each display area within each second time period as a data display rate of each display area within each second time period; and
  acquiring, according to the data display rate of each display area within each second time period, the precautionary range corresponding to each display area within the first time period.

11. The method according to claim 10, wherein the acquiring, according to the data display rate of each display area within each second time period, the precautionary range corresponding to each display area within the first time period comprises:
  determining, according to the data display rate of each display area within each second time period, a maximum precautionary threshold and a minimum precautionary threshold corresponding to each display area within the second time period; and
  determining a range between the maximum precautionary threshold and the minimum precautionary threshold corresponding to each display area within the second time period as the precautionary range corresponding to each display area within the first time period.

12. The method according to claim 11, wherein the determining, according to the data display rate of each display area within each second time period, a maximum precautionary threshold and a minimum precautionary threshold corresponding to each display area within the second time period comprises:
  determining a maximum data display rate of the data display rate of each display area within each second time period as the maximum precautionary threshold corresponding to each display area within the second time period; and
  determining a minimum data display rate of the data display rate of each display area within each second time period as the minimum precautionary threshold corresponding to each display area within the second time period.

13. The method according to claim 11, wherein the determining, according to the data display rate of each display area within each second time period, a maximum precautionary threshold and a minimum precautionary threshold corresponding to each display area within the second time period comprises:
  determining, according to the data display rate of each display area within each second time period, an average data display rate of each display area within the second time period;
  determining a sum of the average data display rate and a preset threshold as the maximum precautionary threshold corresponding to each display area within the second time period; and
  determining a difference between the average data display rate and the preset threshold as the minimum precautionary threshold corresponding to each display area within the second time period.

14. A display control apparatus for multimedia data, comprising:
  a distribution module, configured to distribute each piece of multimedia data to a corresponding display area;
  a first acquisition module, configured to acquire a real display count and a planning display count of each piece of multimedia data in each display area within a first time period;
  a second acquisition module, configured to acquire, according to the real display counts of all multimedia data in each display area within the first time period acquired by the first acquisition module, a total real display count corresponding to each display area within the first time period;
  a third acquisition module, configured to acquire, according to the planning display counts of all multimedia data in each display area within the first time period acquired by the second acquisition module, a total planning display count corresponding to each display area within the first time period;
a first determination module, configured to determine a ratio of the total real display count to the total planning display count corresponding to each display area within the first time period as a data display rate of each display area within the first time period; and
a control module, configured to control, according to the data display rate of each display area within the first time period determined by the first determination module, multimedia data displayed in each display area;
the display area being at least one, and any multimedia data corresponding to at least one display area.

15. The apparatus according to claim 14, wherein the control module comprises:
a first determination submodule, configured to determine, according to a geographical location of each display area, a presentation area of each display area on a map presentation page;
a first display submodule, configured to display, in the presentation area of each display area on the map presentation page, a name corresponding to each display area;
a second display submodule, configured to display, according to the data display rate of each display area within the first time period, a corresponding color in the presentation area of each display area on the map presentation page; and
a control submodule, configured to control, according to the color displayed in the presentation area of each display area on the map presentation page, multimedia data displayed in each display area.

16. The apparatus according to claim 15, wherein the map presentation page comprises an automatic play function; and the control module further comprises:
an acquisition submodule, configured to acquire, after the automatic play function is selected, start time and end time of the automatic play function;
a division submodule, configured to divide a time period corresponding to the start time and the end time into at least two sub-time periods;
a second determination submodule, configured to determine a data display rate of each display area within each sub-time period;
a third determination submodule, configured to determine a first color corresponding to the data display rate of each display area within each sub-time period;
a selection submodule, configured to select a sub-time period at an interval of a preset time on the basis of a time order of the sub-time periods; and
a third display submodule, configured to display the color in the presentation area of each display area on the map presentation page as the first color corresponding to the data display rate of each display area within the selected sub-time period.

17. The apparatus according to claim 16, wherein the second determination submodule comprises:
a first acquisition unit, configured to acquire a real display count and a planning display count of each piece of multimedia data in each display area within each sub-time period;
a second acquisition unit, configured to acquire, according to the real display counts of all multimedia data in each display area within each sub-time period, a total real display count corresponding to each display area within each sub-time period;
a third acquisition unit, configured to acquire, according to the planning display counts of all multimedia data in each display area within each sub-time period, a total planning display count corresponding to each display area within each sub-time period; and
a determination unit, configured to determine a ratio of the total real display count to the total planning display count corresponding to each display area within each sub-time period as a data display rate of each display area within each sub-time period.

18. The apparatus according to claim 15, wherein the second display submodule comprises:
a first determination unit, configured to determine a second color corresponding to the data display rate of each display area within the first time period; and
a first display unit, configured to display the color in the presentation area of each display area on the map presentation page as the second color corresponding to the data display rate of each display area within the first time period determined by the first determination unit.

19. The apparatus according to claim 14, wherein the apparatus further comprises:
a second determination module, configured to determine, according to the data display rate of each display area within the first time period, a display area meeting a precautionary condition; and
a sending module, configured to send, when the second determination module determines that at least one display area meets the precautionary condition, a precautionary alarm to the display area meeting the precautionary condition.

20. The apparatus according to claim 19, wherein the apparatus further comprises:
a third determination module, configured to determine a presentation area of each display area meeting the precautionary condition on the map presentation page; and
a display module, configured to display an edge color of the presentation area of each display area meeting the precautionary condition on the map presentation page as a preset color.

* * * * *